US007043685B2

(12) United States Patent
Azuma

(10) Patent No.: US 7,043,685 B2
(45) Date of Patent: May 9, 2006

(54) WEB-CONTENT PROVIDING METHOD AND WEB-CONTENT PROVIDING SYSTEM

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 598 days.

(21) Appl. No.: 10/093,637

(22) Filed: Mar. 11, 2002

(65) Prior Publication Data

US 2002/0129130 A1     Sep. 12, 2002

(30) Foreign Application Priority Data

Mar. 12, 2001     (JP)     ............................... 2001-068394

(51) Int. Cl.
*G06F 15/00*     (2006.01)
(52) U.S. Cl. .................. 715/501.1; 715/513; 709/202; 709/218
(58) Field of Classification Search ............ 715/501.1, 715/513, 526, 517, 520; 709/202, 218, 203, 709/217, 220, 226
See application file for complete search history.

(56) References Cited

U.S. PATENT DOCUMENTS

| | | | | |
|---|---|---|---|---|
| 6,038,668 | A * | 3/2000 | Chipman et al. | 713/201 |
| 6,199,077 | B1 * | 3/2001 | Inala et al. | 715/501.1 |
| 6,327,628 | B1 * | 12/2001 | Anuff et al. | 719/311 |
| 6,591,300 | B1 * | 7/2003 | Yurkovic | 709/226 |
| 6,668,353 | B1 * | 12/2003 | Yurkovic | 715/501.1 |
| 6,691,106 | B1 * | 2/2004 | Sathyanarayan | 707/3 |
| 2001/0023414 | A1 * | 9/2001 | Kumar et al. | 705/35 |
| 2001/0032092 | A1 * | 10/2001 | Calver | 705/1 |
| 2002/0055933 | A1 * | 5/2002 | Feathers et al. | 707/104.1 |
| 2002/0065877 | A1 * | 5/2002 | Kowtko et al. | 709/203 |
| 2002/0091923 | A1 * | 7/2002 | Chipman et al. | 713/168 |

FOREIGN PATENT DOCUMENTS

JP     2002-259215     9/2002

OTHER PUBLICATIONS

Bogonikolos et al., "Archimides": An Intelligent Agent for Adaptive-Personalized Navigation within a WEB Server, Proceedings of the 23nd Hawaii International Conference on System Science, Jan. 1999, 9 pages.*

* cited by examiner

*Primary Examiner*—William Bashore
*Assistant Examiner*—MaiKhanh Nguyen
(74) *Attorney, Agent, or Firm*—Foley & Lardner LLP

(57) ABSTRACT

A user authentication manager performs user authentication based on user identification information and password stored in an organization-definition-information storage section, in accordance with a log-in request from a user terminal. An organization's portal generator acquires an organization of a user, based on personal organization information stored in the organization-definition-information storage section. The organization's portal generator acquires address information of the organization of the user, from the address information of the organization content stored in the organization-definition-information storage section, and provides a user terminal with Web contents. The navigation generator generates navigation generating information regarding the hierarchical structure stored in the organization-definition-information storage section.

6 Claims, 22 Drawing Sheets

FIG. 2

| | IDENTIFIER | EXECUTION METHOD |
|---|---|---|
| USER AUTHENTICATION MANAGER | ab.servlet.userAuth | http://www.ab.com/servlet/userAuth?UID=$uid$&PASSWD=&passwd& |
| ORGANIZATION'S PORTAL GENERATOR | ab.servlet.portalGen | http://www.ab.com/servlet/portalGen?OID=$oid$&UID=$uid$ |
| NAVIGATION GENERATOR | ab.servlet.naviGen | http://www.ab.com/servlet/naviGen?TYPE=$type$&FRM=$frm$&OID=$oid$&UID=$uid$ |

FIG. 3

| TYPE | ITEM | CONTENTS |
|---|---|---|
| ORGANIZATION INFORMATION | ORGANIZATION HIERARCHY | HIERARCHICAL RELATIONSHIP OF ORGANIZATIONS |
| | ORGANIZATION NAME | ORGANIZATION NAME |
| | ORGANIZATION ID | ID FOR IDENTIFYING ORGANIZATION |
| | ORGANIZATION CONTENT | ADDRESS OF ORGANIZATION |
| PERSONAL INFORMATION | USER NAME | USER NAME |
| | USER ID | ID FOR IDENTIFYING INDIVIDUAL USER |
| | PASSWORD | PASSWORD FOR IDENTIFYING INDIVIDUAL |
| | ORGANIZATION | ORGANIZATION OF EACH USER |

FIG. 5

```
dn:o=COMPANY AB
objectclass:portalOrganization
o:COMPANY AB
oid:ORG01
labeledURI:http://www.ab.com/index.html dn:uid=X01,o=COMPANY AB
objectclass:inetOrgPerson
uid:X01
cn:SHOUICHI YOSHIKAWA
userPassword:xxxxxxx dn:ou=DEPARTMENT A,o=COMPANY AB
objectclass:organizationalUnit
ou:DEPARTMENT A
oid:ORG02
labeledURI:http://a-dep.ab.com/index.html dn:uid=X02,ou=DEPARTMENT A,o=COMPANY AB
objectclass:inetOrgPerson
uid:X02
cn:TSUNEHISA KAWAMATA
userPassword:xxxxxxx dn:ou=SECTION A1,ou=DEPARTMENT A,o=COMPANY AB
objectclass:organizationalUnit
ou:SECTION A1
oid:ORG04
labeledURI:http://a-dep.ab.com/a1/index.html
```

```
dn:uid=X04,ou=SECTION A1,ou=DEPARTMENT A,o=COMPANY AB
objectclass:inetOrgPerson
uid:X04
cn:TOMIHIKO AZUMA
userPassword:xxxxxxx dn:ou=SECTION A2,ou=DEPARTMENT A,o=COMPANY AB
objectclass:organizationalUnit
ou:SECTION A2
oid:ORG05
labeledURI:http://a-dep.ab.com/a2/index.html dn:uid=X05,ou=SECTION A2,ou=DEPARTMENT A,o=COMPANY AB
objectclass:inetOrgPerson
uid:X05
cn:HIROYUKI KUBOTA
userPassword:xxxxxxx dn:ou=DEPARTMENT B,o=COMPANY AB
objectclass:organizationalUnit
ou:DEPARTMENT B
oid:ORG03
labeledURI:http://b-dep.ab.com/index.html dn:uid=X03,ou=DEPARTMENT B,o=COMPANY AB
objectclass:inetOrgPerson
uid:X03
cn:TAKUMI SHINOKURA
userPassword:xxxxxxx
```

FIG. 6

| ATTRIBUTE | MEANING |
|---|---|
| dn | IDENTIFIER OF OBJECT |
| objectclass | OBJECT CLASS |
| o | COMPANY NAME |
| ou | ORGANIZATION NAME |
| oid | ORGANIZATION ID |
| labeleURI | ORGANIZATION CONTENT |
| cn | NAME |
| uid | USER ID |
| userPassword | PASSWORD |

FIG. 7

GENERAL FORMAT OF ORGANIZATION NAVIGATION LABELS (1) HORIZONTAL DISPLAY

HIGHEST ORGANIZATION > SECOND HIGHEST ORGANIZATION > ... > N-TH LEVEL ORGANIZATION > USER'S ORGANIZATION (2) VERTICAL DISPLAY

HIGHEST ORGANIZATION

SECOND HIGHEST ORGANIZATION

...

N-TH LEVEL ORGANIZATION

USER'S ORGANIZATION (3) ANCHOR SETTING

- IDENTIFIER OF ORGANIZATION'S PORTAL GENERATOR
- ORGANIZATION ID CORRESPONDING TO LABEL
- USER ID OF USER

FIG. 8

GENERAL FORMAT OF ORGANIZATION-HIERARCHY LINKING LABELS (1) HORIZONTAL DISPLAY

ONE-LEVEL HIGHER ORGANIZATION > CURRENTLY-DISPLAYED ORGANIZATION > ONE-LEVEL LOWER ORGANIZATION (2) VERTICAL DISPLAY

ONE-LEVEL HIGHER ORGANIZATION

CURRENTLY-DISPLAYED ORGANIZATION

ONE-LEVEL LOWER ORGANIZATION (3) ANCHOR SETTING

- IDENTIFIER OF ORGANIZATION'S PORTAL GENERATOR
- ORGANIZATION ID CORRESPONDING TO LABEL
- USER ID OF USER

FIG. 9

| LABEL | ANCHOR SET VALUES |
|---|---|
| COMPANY AB | ab.servlet.portalGen,OID=ORG01,UID=x04 |
| DEPARTMENT A | ab.servlet.portalGen,OID=ORG02,UID=x04 |
| DEPARTMENT B | ab.servlet.portalGen,OID=ORG03,UID=x04 |
| SECTION A1 | ab.servlet.portalGen,OID=ORG04,UID=x04 |
| SECTION A2 | ab.servlet.portalGen,OID=ORG05,UID=x04 |

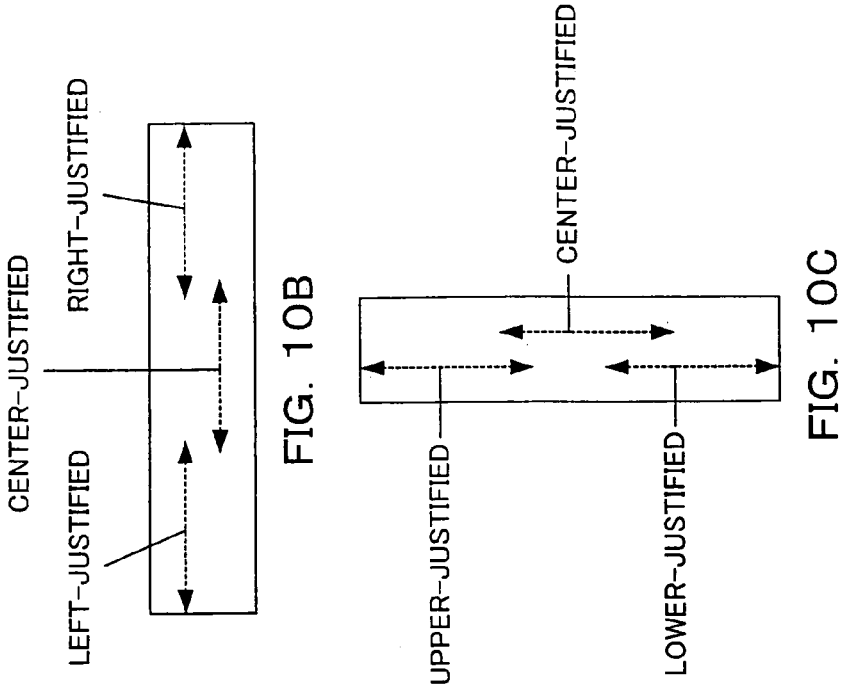
FIG. 10B
FIG. 10C
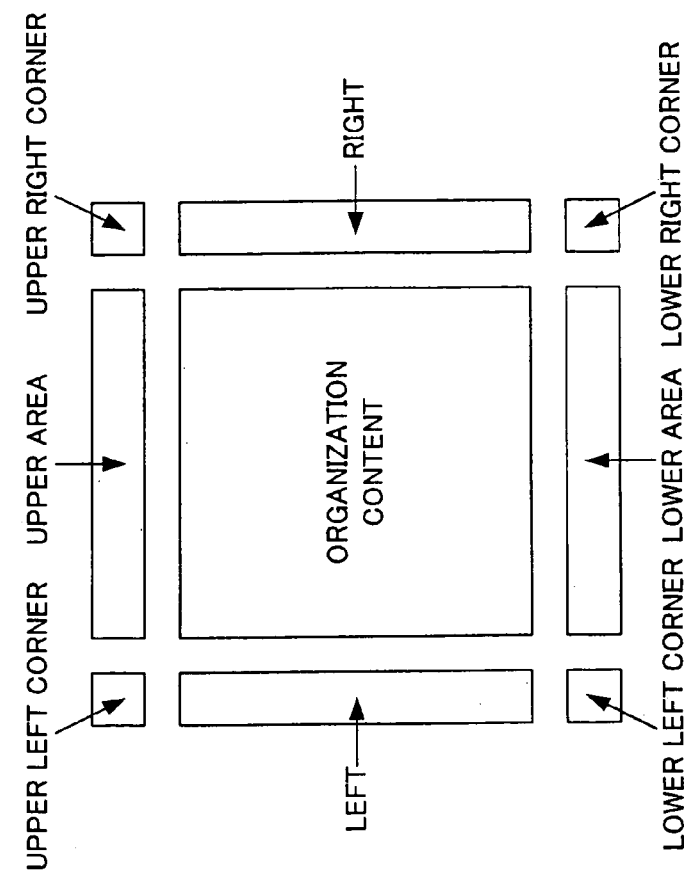
FIG. 10A

FIG. 11

| LABEL TYPE | DISPLAY STYLE | DISPLAY POSITION | HORIZONTAL ARRANGEMENT | VERTICAL ARRANGEMENT |
|---|---|---|---|---|
| ORGANIZATION NAVIGATION LABEL(S) | HORIZONTAL | UPPER AREA | LEFT-JUSTIFIED | CENTER-JUSTIFIED |
| ORGANIZATION-HIERARCHY LINKING LABEL(S) | VERTICAL | LEFT AREA | LEFT-JUSTIFIED | UPPER-JUSTIFIED |

FIG. 18

THERE IS NO ORGANIZATION CONTENT SET

FOR SPECIFIED ORGANIZATION

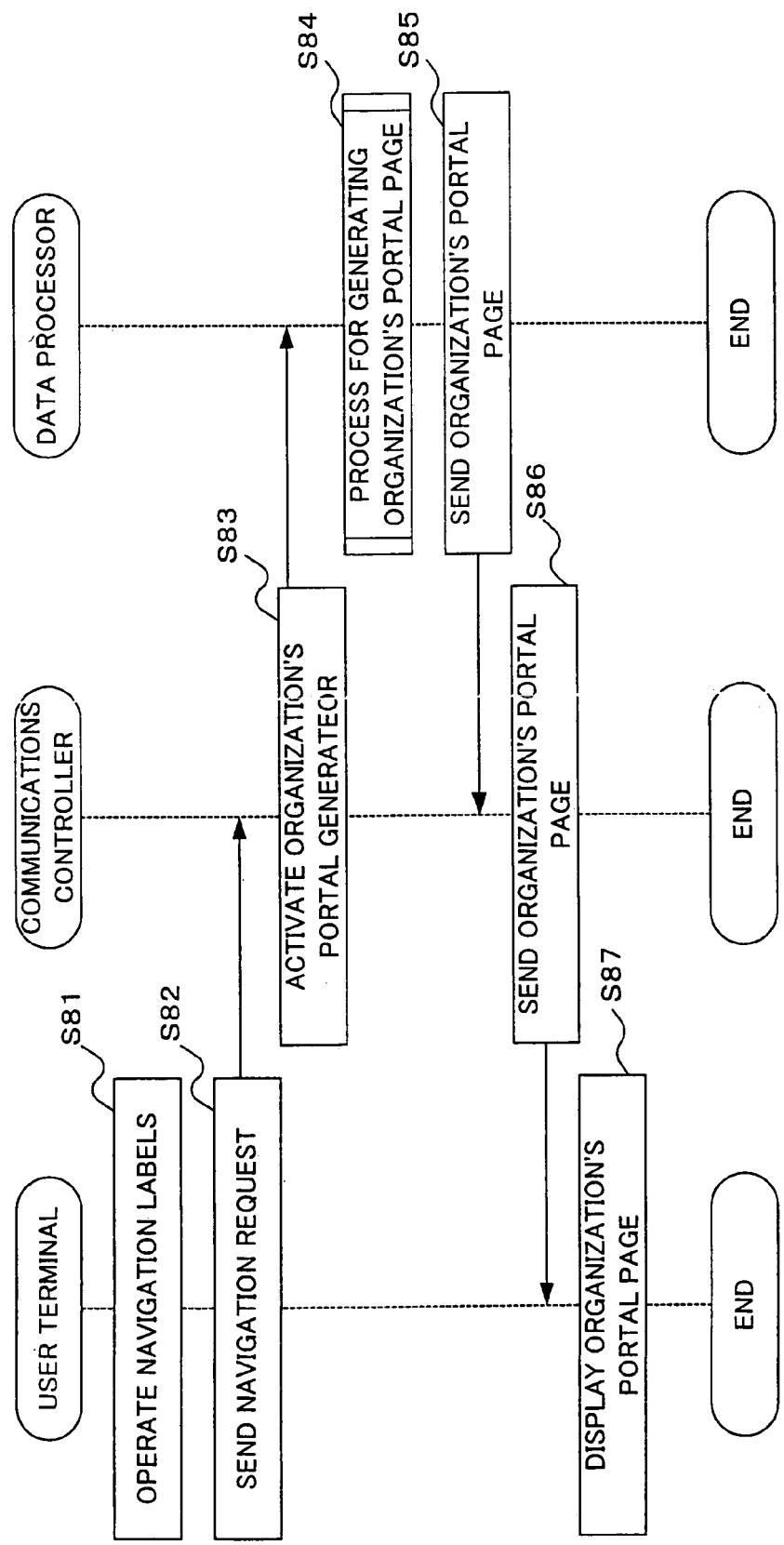

WEB-CONTENT PROVIDING METHOD AND WEB-CONTENT PROVIDING SYSTEM

CROSS REFERENCE TO RELATED APPLICATIONS

This application is related to U.S. patent application Ser. No. 10/003,381, entitled "BUSINESS INFORMATION SYSTEM AND METHOD OF MANAGING BUSINESS INFORMATION" filed Dec. 6, 2001; U.S. patent application Ser. No. 10/003,383, entitled "BUSINESS INFORMATION SYSTEM AND METHOD OF MANAGING BUSINESS INFORMATION" filed Dec. 6, 2001; and U.S. patent application Ser. No. 10/032,078, entitled "ENTERPRISE INFORMATION FILTERING SYSTEM, ENTERPRISE INFORMATION FILTERING METHOD, AND STORAGE MEDIUM STORING THEREIN PROGRAM" filed Dec. 31, 2001, which are all incorporated herein by reference for all purposes in their entirety.

BACKGROUND OF THE INVENTION

1. Field of the Invention

The present invention relates to a Web-content providing method and Web-content providing system, and, more particularly, to a Web-content providing method and Web-content providing system for easily managing Web contents of a plurality of internal organizations within a single group, such as a company, enterprises etc.

2. Description of the Related Art

In a particular group, such as a company, enterprise, etc., departments or sections create and manage Web contents by their own, so as to transmit information to its staffs or to share the information among the plurality of departments or sections. Each of the Web pages statically includes addresses of other Web pages, so that users can easily visit Web pages of different departments or sections therefrom. For example, the Web-page manager of a particular department sets the department's Web page to directly include a Web-page address of each section, so that the users can visit the Web pages of sections which are in a lower level in hierarchy than the level of the department. On the other hand, the Web-page manager of each of the sections sets the section's Web page to directly include a Web-page address of the department's Web page, so that the manager users can visit the Web page of the department which is in a higher level in hierarchy than the levels of the sections.

Addresses of Web pages showing organization contents are managed independently from organization definition information, including the organization hierarchy, a corresponding organization name, each user name in the organization, etc. Because of this, to refers to organization contents corresponding to a certain business, addresses of the entire Web pages need to separately be stored using a certain technique or method. In the case where an address of a Web page is changed, the new address needs to be given to the entire corresponding users.

Furthermore, a problem is that the Web page addresses need to be updated in each of the Web pages including the addresses before changed, and hence requiring bothersome tasks for the Web page managers. Additional problem is that the users can not desirably travel between the Web pages, up until the correction of the new address is completed.

SUMMARY OF THE INVENTION

The present invention has been made in consideration of the above. It is accordingly an object of the present invention to provide a Web-content providing method and Web-content providing system for easily managing addresses of Web Another object thereof is to provide a Web-content providing method and Web-content providing system for reducing the work of an organization-content creator or manager.

Still another object thereof is to provide a Web-content providing method and Web-content providing system for providing appropriate organization contents based on a user's organization.

In order to achieve the above objects, according to the first aspect of the present invention, there is provided a Web-content providing method comprising:

storing first definition information, defining relationship between at least one user and an organization of the at least one user, and second definition information, defining relationship between the organization and address information of a Web content of the organization;

identifying the at least one user;

acquiring information representing the organization to which the at least one user belongs, from the first definition information stored at said storing the first definition information;

acquiring address information of the Web content of the organization, from the second definition information stored at said storing the first definition;

generating an organization's portal page including the Web content of the organization, based on the address information acquired at said acquiring the address information; and providing the at least one user with the organization's portal page generated at said generating.

The storing may include storing third definition information defining relationship between a plurality of organization, and said method may further comprise acquiring information representing relationship between a predetermined organization and another organization corresponding to the predetermined organization from the third definition information stored at said storing, acquiring address information of the another organization from the second definition information, and generating at least one navigation label for navigating a Web content of the another organization using the acquired address information of the another organization.

The third definition information may define hierarchical structure of the plurality of organizations.

The at least one navigation label may include an organization-hierarchy linking label for navigating a Web content of an organization which is higher than the predetermined organization by one level in hierarchy and an organization-hierarchy linking label for navigating a Web content of an organization which is lower than the predetermined organization by one level in hierarchy.

The at least one navigation label may include an organization navigation label for navigating the Web content of the organization of the at least one user and at organization navigation label for navigating the Web content of the another organization corresponding to the organization of the at least one user.

In order to achieve the above objects, according to the second aspect of the present invention, there is provided a Web-content providing system comprising:

a storage section which stores first definition information, defining relationship between at least one user and an organization of the at least one user, and second definition information, defining relationship between the organization and address information of a Web content of the organization;

a user identifier which identifies the at least one user;

an organization's portal generator which acquires information representing the organization of the at least one user identified by said user identifier from the first definition information stored in said storage section, acquires address information of a Web content of the organization of the at least one user from the second definition information stored in said storage section, and generates an organization's portal page including the Web content of the user's organization based on the acquired address information; and an organization's portal page provider which provides the at least one user with the organization's portal page generated by said organization's portal generator The storage section may store third definition information defining relationship between a plurality of organizations, and said system further comprising a navigation-label generator which acquires relationship between a predetermined organization and another organization corresponding to the predetermined organization from the third definition information, acquires address information of a Web content of the another organization from the second definition information, and generates at least one navigation label for navigating the Web content of the another organization using the acquired address information, and wherein said navigation-label generator sends the generated at least one navigation label to said organization's portal generator.

The third definition information may define hierarchical structure of the plurality of organizations.

The at least one navigation label may include an organization-hierarchy linking label for navigating a Web content of an organization which is higher than the predetermined organization by one level in hierarchy and an organization-hierarchy linking label for navigating a Web content of an organization which is lower than the predetermined organization by one level in hierarchy.

The at least one navigation label may include an organization navigation label for navigating the Web content of the organization of the at least one user and an organization navigation label for navigating the Web content of the another organization corresponding to the organization of the at least one user.

The organization's portal generator may acquire an organization ID of the organization of the at least one user identified by said user identifier, and acquire address information of a Web content of the organization based on the acquired organization ID.

In order to achieve the above objects, according to the third aspect of the present invention, there is provided a computer readable recording medium recording a program for controlling a computer to serve as:

a storage section which stores first definition information, defining relationship between at least one user and an organization of the at least one user, and second definition information, defining relationship between the organization and address information of a Web content of the organization;

a user identifier which identifies the at least one user;

an organization's portal generator which acquires information representing the organization of the at least one user identified by said user identifier from the first definition information stored in said storage section, acquires address information of a Web content of the organization of the at least one user from the second definition information stored in said storage section, and generates an organization's portal page including the Web content of the user's organization based on the acquired address information; and an organization's portal page provider which provides the at least one user with the organization's portal page generated by said organization's portal generator.

The computer readable recording medium recording a program for controlling a computer to serve as:

a navigation-label generator which acquires information representing relationship between a predetermined organization and another organization corresponding to the predetermined organization from third definition information, defining relationship between a plurality of organizations and stored in said storage section, acquires address information of a Web content of the another organization from the second definition, and generates at least one navigation label for navigation the Web content of the another organization using the acquired address information.

BRIEF DESCRIPTION OF THE DRAWINGS

These objects and other objects and advantages of the present invention will become more apparent upon reading of the following detailed description and the accompanying drawings in which:

FIG. 2 is a diagram exemplarily showing the structure of procedure information stored in a procedure-information storage section;

FIG. 3 is a diagram exemplarily showing the structure of organization definition information stored in an organization-definition-information storage section;

FIG. 5 is a diagram expressing the organization definition information of FIG. 4 in the form of a directory tree of an LDAP (lightweight Directory Access Protocol) server;

FIG. 6 is a diagram showing the definition of each attribute shown in FIG. 5;

FIG. 7 is a diagram showing the general format of organization navigation labels which are generated automatically by a navigation generator;

FIG. 8 is a diagram showing the general format of organization-hierarchy linking labels which are generated automatically by the navigation generator;

FIG. 9 is a diagram showing set values of anchors that are automatically set for navigation labels corresponding to a user "X04" shown in FIG. 4;

FIG. 10A is a diagram for explaining a method of specifying the display position of navigation labels in an organization's portal page, FIG. 10B is a diagram for explaining a method of specifying the horizontal arrangement of the navigation labels, and FIG. 10C is a diagram for explaining a method of specifying the vertical arrangement of the navigation labels;

FIG. 11 is a diagram exemplarily showing information regarding the display setting of navigation labels;

FIG. 18 is a diagram showing an example of a default content (an error page) representing that there is no organization content set for a particular organization;

FIG. 21 is a diagram for explaining procedures for traveling between organization contents using the navigation labels included in the organization's portal page;

DETAILED DESCRIPTION OF THE PREFERRED EMBODIMENT

A preferred embodiment of the present invention will now be described with reference to the accompanying drawings.

In a Web-content providing system of tins embodiment, Web content (hereinafter referred to as "organization content") which is created and/or managed by each internal organization of, for example, a predetermined company is managed in association with organization definition information. The organization definition information includes the hierarchical structure of the organizations, the organization names, staff names of each organization. In doing so, the suitable organization content can automatically be selected based on the organization that each staff belongs to. Note, in the Web-content providing system of this embodiment, a navigation label is to represent some kind of information in a Web page and is prepared for accessing one organization content from another organization content. This navigation label is automatically created, using information representing each staff's organization information or information representing the hierarchical structure of the organizations. In this structure, it is not necessary that the different organization contents be linked to each other, and hence remarkably eliminating the work of organization-content creator or Web-content manager.

Figure 1:
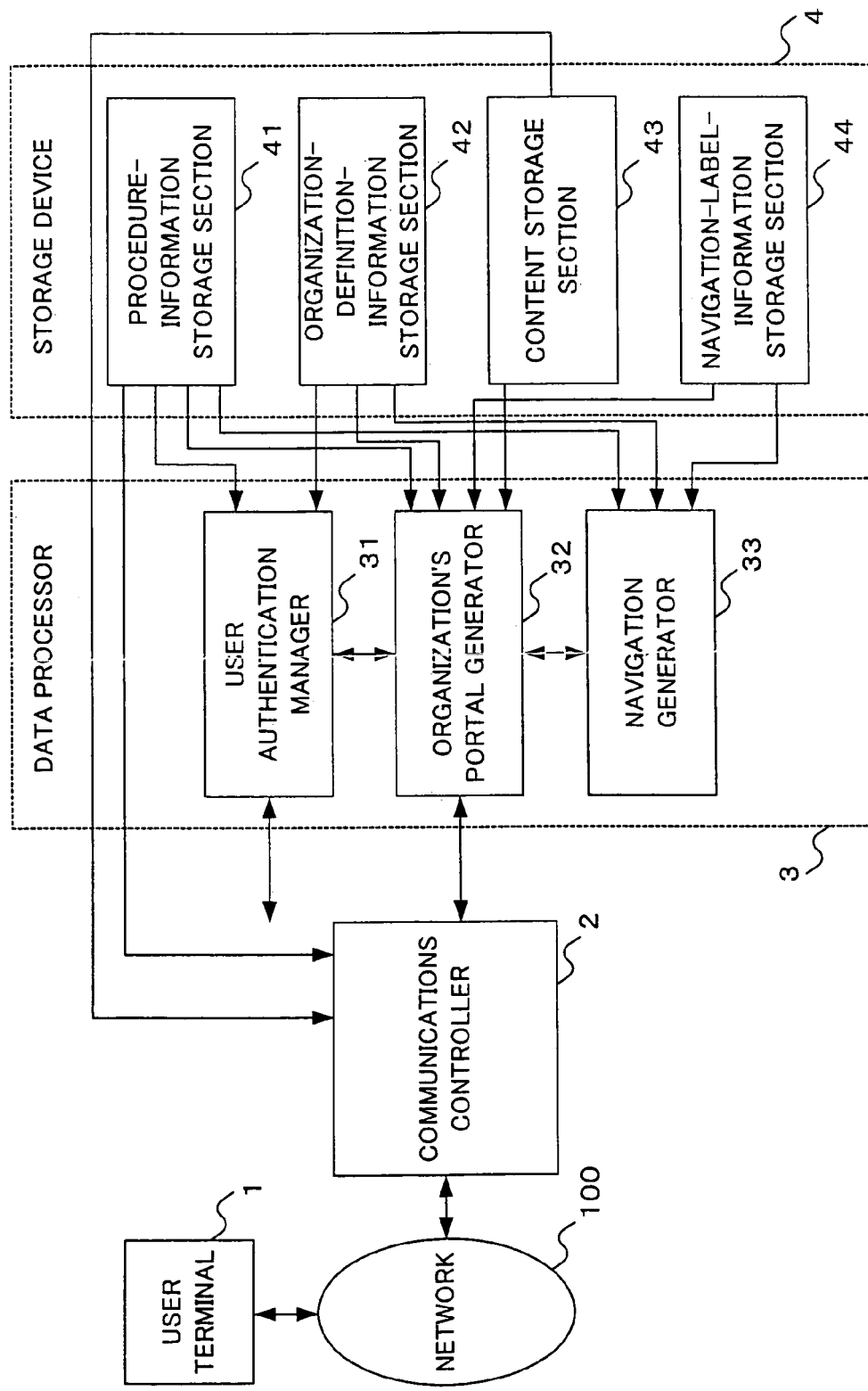
FIG. 1 is a block diagram showing the structure of a Web-content providing system according to an embodiment of the present invention.

FIG. 1 is a block diagram showing the structure of a Web-content providing system according to an embodiment of the present invention.

As shown in FIG. 1, the Web-content providing system of this embodiment comprises a user terminal 1, a cable/radio network 100, a communications controller 2 which control transmitting/receiving of data to/from the network 100, a data processor 3 which operates in accordance with the control of a program, and a storage device 4 which stores information.

The user terminal 1 is a terminal including an input/output device and a system for connecting to a cable or radio communications network, such as the Internet, etc. The user terminal 1 includes a personal computer, a cellular phone, a portable information terminal, or the like.

The communications controller 2 connects the network 100 with the data processor 3, to send and receive various information through the network 100. The communications controller 2 has a function for selecting an appropriate procedure to be executed by the data processor 3 and for executing the selected procedure, and a function for sending information representing a result or the procedure executed by the data processor 3 to the user terminal 1, in accordance with a request received from the user terminal 1.

The data processor 3 performs data communications with the user terminal 1 through the communications controller 2, and processes various information. The data processor 3 comprises a user-authentication manager 31, an organization's portal generator 32 and a navigation generator 33.

The user-authentication manager 31 is to determine whether a requester who is trying to log in the Web-content providing system of this embodiment is a proper user. The user-authentication manager 31 is to also instruct the organization's portal generator 32 to create a portal page (hereinafter referred to as an organization portable page) including the organization content to be displayed immediately after the user logs in the system.

The organization's portal generator 32 combines the organization content with the navigation label created by the navigation generator 33, thereby creating an organization's portal page suitable for the user.

The navigation generator 33 is to create a navigation label for travelling between organization contents of the Web-content providing system of this embodiment. With utilization of this navigation label, the user can refer to another organization content of another organization. The navigation label may, for example, be an organization-navigation label for making a list of organizations that users directly or indirectly belong to, or an organization-hierarchy linking label for making a list of organization contents, one of which is higher and the other one of which is lower than the organization content currently appearing on the organization's portal page by one level in hierarchy.

The storage device 4 includes a semiconductor memory, a magnetic disk recording device, etc., and is to store various information or programs. The storage device 4 comprises a procedure-information storage section 41, an organization-definition-information storage section 42, a content storage section 43 and a navigation-label-information storage section 44.

The procedure-information storage section 41 is an area for storing information necessary for controlling the data processor 3 to execute various procedures. In this area, identifiers and execution methods of various procedures to be executed by the data processor 3 are stored. FIG. 2 shows an example of the structure of procedure information stored in the procedure-information storage section 41.

As shown in FIG. 2, the procedure-information storage section 41 defines, for example, a call for the user authentication manager 31 through a predetermined servlet. In this case, specifically, the user authentication manager 31 is called using its address "http://www.ab.com/servlet/userAuth" in association with an identifier "ab.servlet.userAuth" of the user authentication manager 31. In the procedure-information storage section 41, it is defined to provide the predetermined servlet with an argument of "UID" representing a user ID of the user and another argument of "PASSWD" representing a password of the user.

The procedure-information storage section 41 defines a call for the organization's portal generator 32 through a predetermined servlet. In this case, specifically, the organization's portal generator 32 is called using its address "http://www.ab.com/servlet/portalGen" in association with an identifier "ab.servlet.portalGen" of the organization's portal generator 32. In the procedure-information storage section 41, it is defined to provide the predetermined servlet with an argument of "OID" representing an organization ID of a corresponding organization and the argument of "UID" representing the user ID of the user.

Further, the procedure-information storage section 41 defines a call for the navigation generator 33 through a predetermined servlet. In this case, specifically, the navigation generator 33 is called using its address "http://www.ab-.com/servlet/naviGen" in association with an identifier "ab.servlet.naviGen" of the navigation generator 33. In the procedure-information storage section 41, it is defined to provide the predetermined servlet with an argument of "TYPE" representing the type of a navigation label, an argument of "FRM" representing the display format, the argument of "OID" representing the organization ID and the argument of "UID" representing the user ID.

As shown in FIG. 2, the above user-authentication manager 31, the organization's portal generator 32 and the navigation generator 33 are called through the servlet. However, the method for calling the user-authentication manager 31, the organization's portal generator 32 and the navigation generator 33 is not limited to the above, and they can be called or executed using any method as long as the method for executing them and information regarding the arguments can clearly be defined. For example, a repository or registry managing an ORG (Object Request Broker) or EJG (Enterprise, Java Beans) may be stored in the procedure-information storage section 41, and can be used for calling the above.

The organization-definition-information storage section 42 is an area for storing information, representing both the organization definition and the organization content. FIG. 3 shows an example of the structure of the organization definition information stored in the organization-definition-information storage section 42.

As shown in FIG. 3, the organization definition information is composed of information (organization information) regarding organizations and information (personal information) regarding individuals. The organization information includes: the organization hierarchy (the third definition information) representing the hierarchical relationship of organizations; organization name; organization ID uniquely identifying organizations, respectively; and address (the second definition information) of each organization content created and/or managed by each organization. The personal information includes: user name; user ID and password for uniquely identifying each individual; and organization (the first definition information) to which the individual directly belongs.

Figure 4:
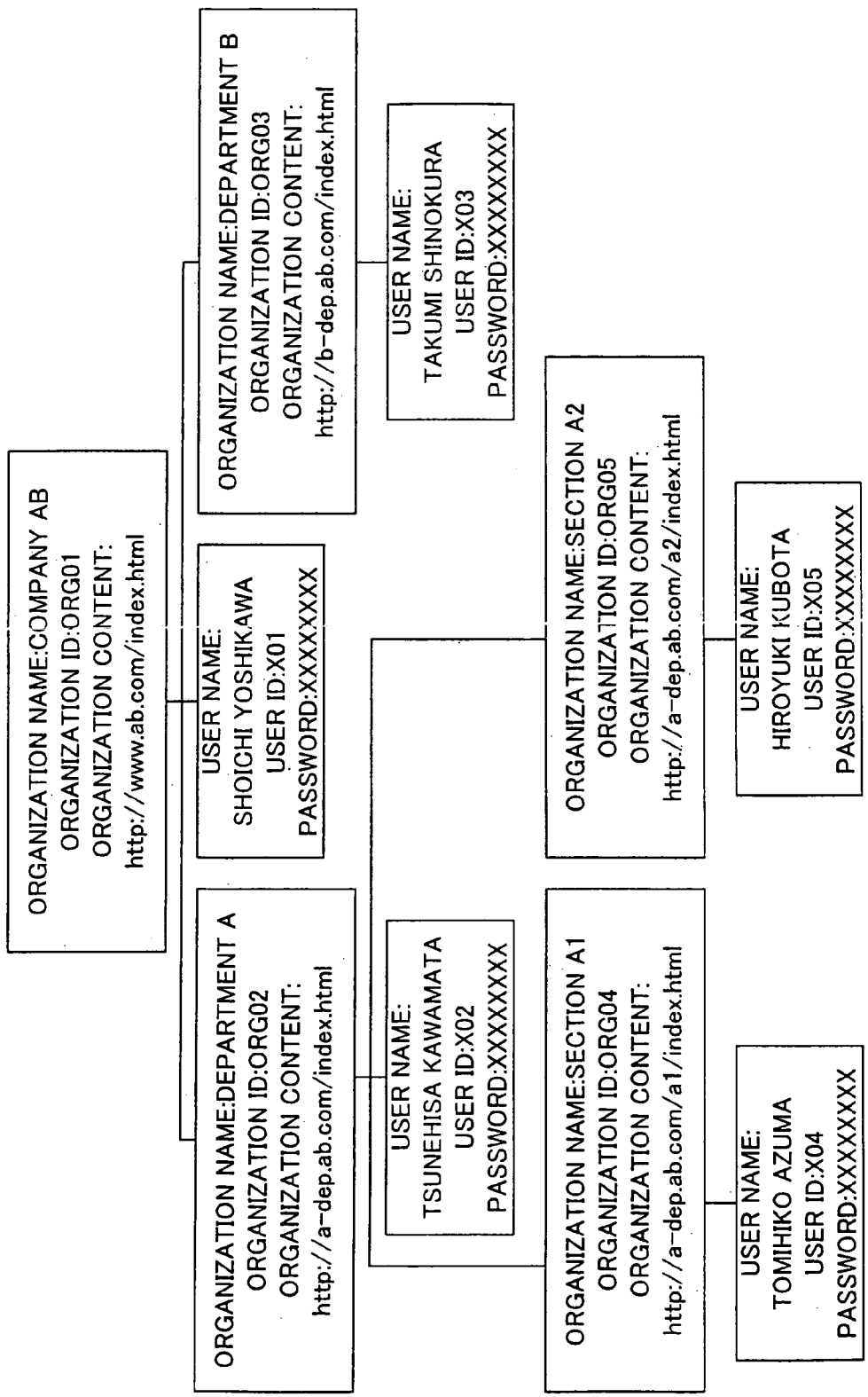
FIG. 4 is a diagram showing the hierarchical structure of organizations, as an example of the organization definition information stored in the organization-definition-information storage section.

FIG. 4 shows an example of the organization definition information stored in the organization-definition-information storage section 42. FIG. 4 shows the organization hierarchy of a "company B" in the form of a reverse tree form, and shows the hierarchic relationship of organizations within the "company AB" based on the positional relationship of the organizations and individuals shown above or below another organization.

As illustrated in FIG. 4, the "company AB" comprises a "department A" and a "department B". The "department A" comprises a "section A1" and a "section A2". As seen from FIG. 4, it can be understood that a staff, whose user ID is "01", directly belong to the uppermost organization, i.e. the "company AB". Similarly, a staff whose user ID is "X02" directly belongs to the "department A", a staff whose user ID is "X03" is directly belongs to the "department", a staff whose user ID is "X04" is directly belongs to the "section A1", and a staff whose user ID is "X05" is directly belongs to the "section A2". In FIG. 4, an organization name, organization ID and organization content are defined for each organization, while a name, user ID and his/her password are defined for each individual.

FIG. 5 shows an example of the organization definition information of FIG. 4, in the form of a directory tree of an LDAP (Lightweight Directory Access Protocol) server. FIG. 5 also shows the directory tree of the LDAP in an LDIF (LDAP Data Interchange Format). In FIG. 5, the positional relationship within the organization hierarchy is identified with an identifier of "dn".

As shown in FIG. 5, the description of "dn:o=company AB" represents that the "company AB" is the uppermost organization, i.e. in the highest level in hierarchy. The description of "dn:on=department A, o=company AB" represents that the "department A" is subordinate directly to the "company AB", while the description of "dn:ou=section A1, ou=department A, o=company AB" represents that the "section A1" is subordinate directly to the "department A1". In FIG. 5, the identifier "dn" is used for identifying the organization that each individual belongs to. In FIG. 5, the description of "dn:uid=X01, o=company AB" represents that the staff having the user ID of "X01 directly belongs to the "company AB". Similarly, the description of "dn: uid=X02, ou=department A, o=company AB" represent; that the staff having the user ID of "X02" directly belongs to the "department A". Further, the description of "dn:uid=X04, ou=section A1, ou=department A, o=company AB" represents that the staff having the user ID of "X04" directly belongs to the "section A1". FIG. 6 shows definitions of attributes employed in the LDAP directory of FIG. 5.

The content storage section 43 is an area for storing contents provided by the Web-content providing system of this embodiment, and stores organization contents, a log-in page, an error page, etc.

The navigation-label-information storage section 44 is an area for storing information regarding a navigation label(s) for use in the system of this embodiment. Specifically, the navigation-label-information storage section 44 stores the type, display style, display position and array of navigation labels.

FIG. 7 shows the general format of "organization navigation labels" which are automatically generated by the navigation generator 33. The "organization navigation labels" are to represent a list of organization contents of organizations to which the user directly or indirectly belong.

As shown in FIG. 7, the plurality of organization navigation labels can be displayed either horizontally or vertically, depending upon selection of the display form. Each of the organization navigation labels represents an organization, and may include an anchor set thereunder. Note that the anchor, in this case, is data to be sent by the user terminal 1 to the communications controller 2 through the network 100, in the case where the user selects a label showing a particular organization name using the user terminal 1. In this embodiment, anchors are the identifier of the organization's portal generator 32 which is stored in the procedure-information storage section 41, the organization ID corresponding to the selected label, and the user ID of the user. An underline is attached to any of those labels to which an anchor is set, so as to distinguish the underlined label from non-underlined labels.

FIG. 8 shows the general format of "organization-hierarchy linking labels" which are automatically generated by the navigation generator 33. The "organization-hierarchy linking labels" are to represent a list of organization contents, one of which is higher and the other one of which is lower than the organization content currently displayed in the organization's portal page by one level.

As shown in FIG. 9, the "organization-hierarchy linking labels" can be displayed either in horizontally or vertically, depending upon selection of their display form. Likewise the "organization navigation labels", each of the "organization-hierarchy linking labels" represents an organization, and can include an anchor set thereunder. However, no anchor is set under a label corresponding to the organization content currently displayed on the organization's portal page. Likewise the case of the "organization navigation labels", an underline is attached to any of those organization-hierarchy linking labels with the anchor.

FIG. 9 is a diagram showing set values of anchors that are automatically set for navigation labels corresponding to a user "X04" shown in FIG. 4.

As shown in FIG. 9, the set value of the anchor attached under the label corresponding to the "company AB" includes the identifier "ab.servlet.portalGen" of the organization's portal generator 32, the organization ID "ORG01" of the "company AB", and the user ID "X04" of the user. In the case of the same user, the set values of the different anchors include different organization IDs, the same identifier of the organization's portal generator 32 and the same user ID. Specifically, the set value of the anchor under the label corresponding to the "department A" includes the organization ID of "ORG02", the anchor under the label of the "department B" includes the organization ID of "ORG03", the anchor under the label of the "section A1" includes the organization ID of "ORG04", and the anchor under the label of the "section A2" includes the organization ID of "ORG05".

FIG. 10A is a diagram for explaining a method of specifying the display position of navigation labels included in the organization's portal page, FIG. 10B is a diagram for explaining a method of specifying the horizontal arrangement of navigation labels, and FIG. 10C is a diagram for explaining a method of specifying the vertical arrangement of navigation labels.

As shown in FIG. 10A, in the organization's portal page, the display area of the navigation labels can be specified. In this case, the navigation labels may be specified to be displayed either in the upper section, lower section, left side, right side, or one of the four corners, in the display area of the organization content.

As shown in FIG. 10B, the navigation labels in the specified display area can be specified to be displayed horizontally. For example, the navigation labels may be specified to be arranged horizontally, and more specifically be left-justified, right-justified, or center-justified in a horizontal direction.

As shown in FIG. 10C, the navigation labels in the specified display area can be specified to be displayed vertically. For example, the navigation labels may be specified to be arranged vertically, and more specifically be upper-justified, lower-justified or center-justified in a vertical direction.

FIG. 11 shows an example of information regarding the display setting of navigation labels to be displayed on the organization's portal page. In FIG. 11, as the navigation labels, the organization navigation labels and the organization-hierarchy linking labels are employed as the navigation labels. As shown in FIG. 11, it is specified to display the organization navigation labels horizontally as shown in FIG. 7. Further, the organization navigation labels are specified to be displayed in the upper section, to be left-justified in a horizontal direction, and to be center-justified in a vertical direction.

Further, as shown in FIG. 11, it is specified to display the organization-hierarchy linking labels vertically as shown in FIG. 8. Further, the organization-hierarchy linking labels are specified to be displayed in the left side of the organization content, to be left-justified in a horizontal direction, and to be upper-justified in a vertical direction.

Figure 12:
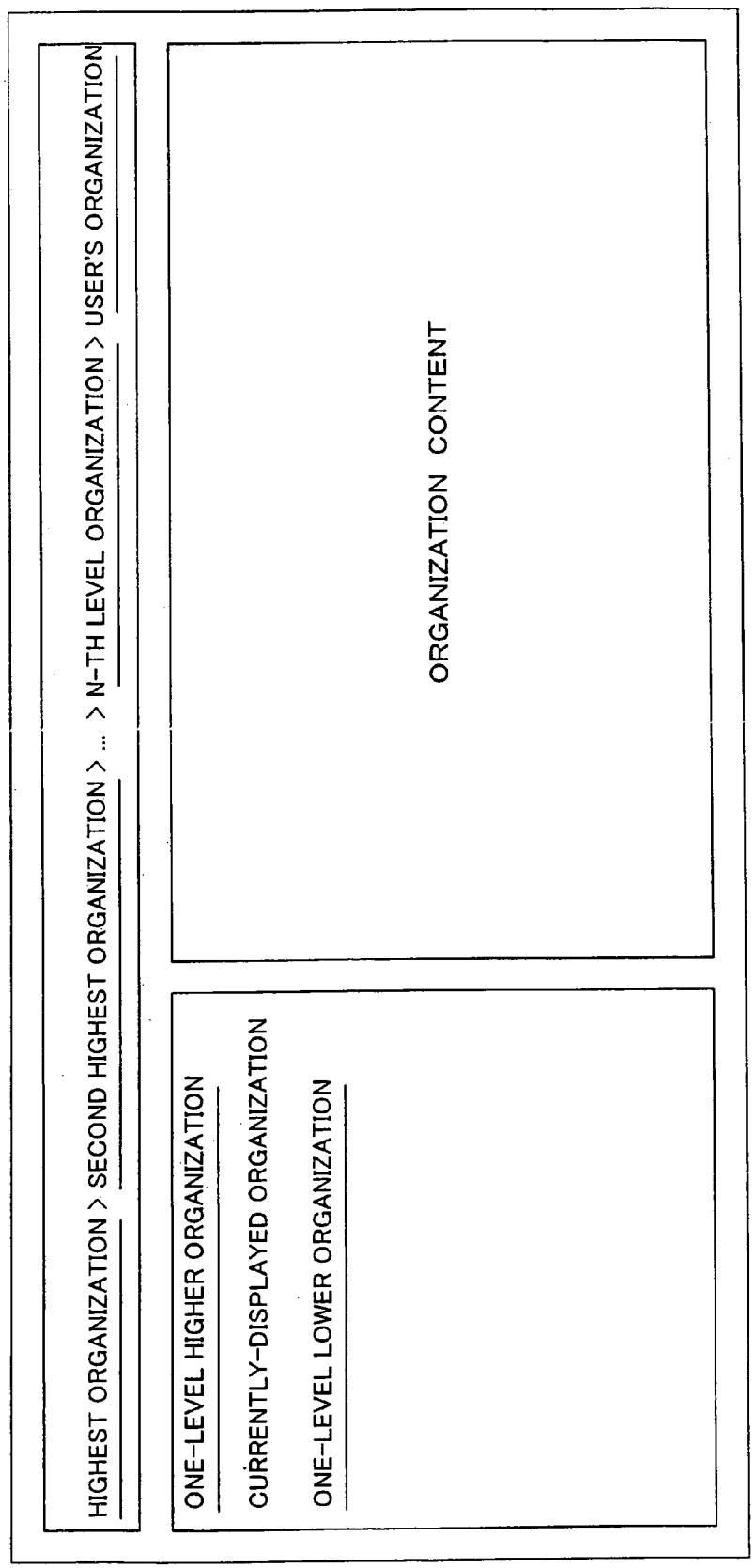
FIG. 12 is a diagram showing the general format of the organization's portal page generated by the organization's portal generator.

FIG. 12 shows the general format of the organization's portal page generated by the organization's portal generator 32, based on the information of FIG. 11. As shown in FIG. 12, displayed on the organization's portal page are an organization content, the organization navigation labels, and the organization-hierarchy linking labels. The display style, the display positions, the horizontal arrangement and vertical arrangement of the navigation labels are determined in accordance with the definition of FIG. 11.

Operations of the data processor 3 including the user authentication manager 31, the organization's portal generator 32 and the navigation generator 33 will now be described.

The user authentication manager 31 is activated by the communications controller 2, based on an activation (execution) method stored in the procedure-information storage section 41. The user authentication manager 31 is provided with arguments of the user ID and password of the user, from the communications controller 2. Upon this, the user authentication manager 31 collates the organization definition information stored in the organization-definition-information storage section 42, with the provided user ID and password, so as to determine whether a requester who is trying to log in the system of this embodiment is a proper user.

In the case where it is determined that the requester is a proper user, the user authentication manager 31 acquires an organization ID of the user's organization (an organization that the user belongs to) from the organization-definition-information storage section 42, based on the user ID of the user. Then, the user authentication manager 31 activates the organization's portal generator 32 using the user ID and organization ID as arguments. After this, the user authentication manager 31 receives all organization's portal page from the organization's portal generator 32, and sends the received organization's portal page to the communications controller 2.

On the contrary, in the case where it is determined that the requester is not a proper user, the user authentication manager 31 acquires an error page representing a failure in the user authentication from the content storage section 43, and sends the acquired error page to the communications controller 2.

The organization's portal generator 32 is activated by the user authentication manager 31 at the time the user is to log in the system of this embodiment, while it is activated by the communications controller 2 in the case where the user requests the system of this embodiment to change the organization content using a navigation system. In either case, the organization's portal generator 32 is activated using the activation method stored in the procedure-information storage section 41, and is provided with the arguments, i.e. the user ID of the user and the organization ID of the organization having an organization content to be displayed.

The organization's portal generator 32 searches the organization-definition-information storage section 42 for an address of the organization content to be displayed, based on the received organization ID, and acquires the organization content from the content storage section 43 using the searched address. The organization's portal generator 32 activates the navigation generator 33 based on arguments, i.e. the type of navigation labels, the display style of the labels, the user ID and the organization ID, in order to generate the navigation labels stored in the navigation-label-information storage section 44. Further, the organizations portal generator 32 combines the navigation labels generated by the navigation generator 33 with the organization content, based on the display position and arrangement which are stored in the navigation-label-information storage section 44, so as to generate an organization's portal page. Then, the organization's portal generator 32 sends the generated organization-portable page to the user authentication manager 31 or communications controller 2 having activated the organization's portal generator 32.

The navigation generator 33 is activated by the organization's portal generator 32 using the activation method stored in the procedure-information storage section 41. The navigation generator 33 is provided with arguments, i.e. the type of navigation labels, the display style of the navigation labels, the user ID of the user and the organization ID of the organization of the organization content to be displayed, from the organization's portal generator 32.

In the case where the organization navigation labels are specified as the type of navigation labels, the navigation generator 33 searches the organization-definition-information storage section 42 for the organization ID and organization name of the organization that the user directly or indirectly belongs to, based on the provided user ID. Then, the navigation generator 33 generates the organization navigation labels, in accordance with the provided display style.

In the case where the organization-hierarchy linking labels are specified as the type of navigation labels, the navigation generator 33 searches the organization-definition-information storage section 42 using the provided organization ID, for the organization names and organization IDs of organizations, one of which is higher and the other one of which is lower than the organization identified with the organization ID by one level in hierarchy. Then, the navigation generator 33 generates the organization-hierarchy linking labels in accordance with the received display style. In other case, the navigation generator 33 sends the generated navigation labels to the organization's portal generator 32.

Explanations will now be made to a content providing method to be carried out by the Web-content providing system according to this embodiment.

Once the user sends a request for logging in the Web-content providing system, using the user terminal 1 to the communications controller 2 through the network 100, the communications controller 2 refers to the procedure-information storage section 41 and activates the user authentication manager 31 (user identification unit).

The user authentication manager 31 determines whether the user having sent the log-in request is a proper user of the system, based on information stored in the organization-definition-information storage section 42, In the case where it is determined that the user is a proper user, the user authentication manager 31 identifies the user, activates the organizations portal generator 32 using the ID information of the user and ID information of the organization that the user directly belongs to as arguments, and instructs the organization's portal generator 32 to generate a organization's portal page suitable in the case where the user is just logging in the system.

The organization's portal generator 32 acquires an address of the organization content from the organization-definition-information storage section 42 using the provided ID information of the organization, and acquires the actual organization content from the content storage section 43. Further, the organization's portal generator 32 activates the navigation generator 33, thereby automatically generate navigation labels stored, in the navigation-label-information storage section 44. At this time, the organization's portal generator 32 provides the navigation generator 33 with the ID information of the current user and the ID information of the organization corresponding to the organization content to be displayed, in order to generate navigation labels in the most suitable form corresponding to the current conditions of the organization's portal page.

The navigation generator 33 acquires the user's organization and hierarchical structure of organizations from the organization-definition-information storage section 42, based on the user ID and organization ID. Then, the navigation generator 33 automatically generates navigation labels based on the organization definition. The organization's portal generator 32 combines the organization content of the user's organization with the automatically-generated navigation labels, so as to generate an organization's portal page. Thus generated organization's portal page is sent by the communications controller 2 to the user terminal 1 through the network 100.

The user operates a navigation label shown in the organization's portal page on the user terminal 1, and sends a navigation request to the communications controller 2 to select an organization content to be displayed next. This navigation request include the ID information of the user and the ID information of the organization having the selected organization content.

Upon reception of the navigation request from the user terminal 1 through the network 100, the communications controller 2 activates the organization's portal generator 32, based on the ID information of the user and the ID information of the selected organization as arguments.

Likewise the case of logging-in the system, the organization's portal generator 32 acquires the organization content based on the provided ID information of the organization. At the same time, the organization's portal generator 32 activates the navigation generator 33, automatically generates the navigation labels, and generates an organization's portal page corresponding to the navigation request from the user. Thus generated organization's portal page is sent by the communications controller 2 to the user terminal 1 through the network 100.

Figure 13:
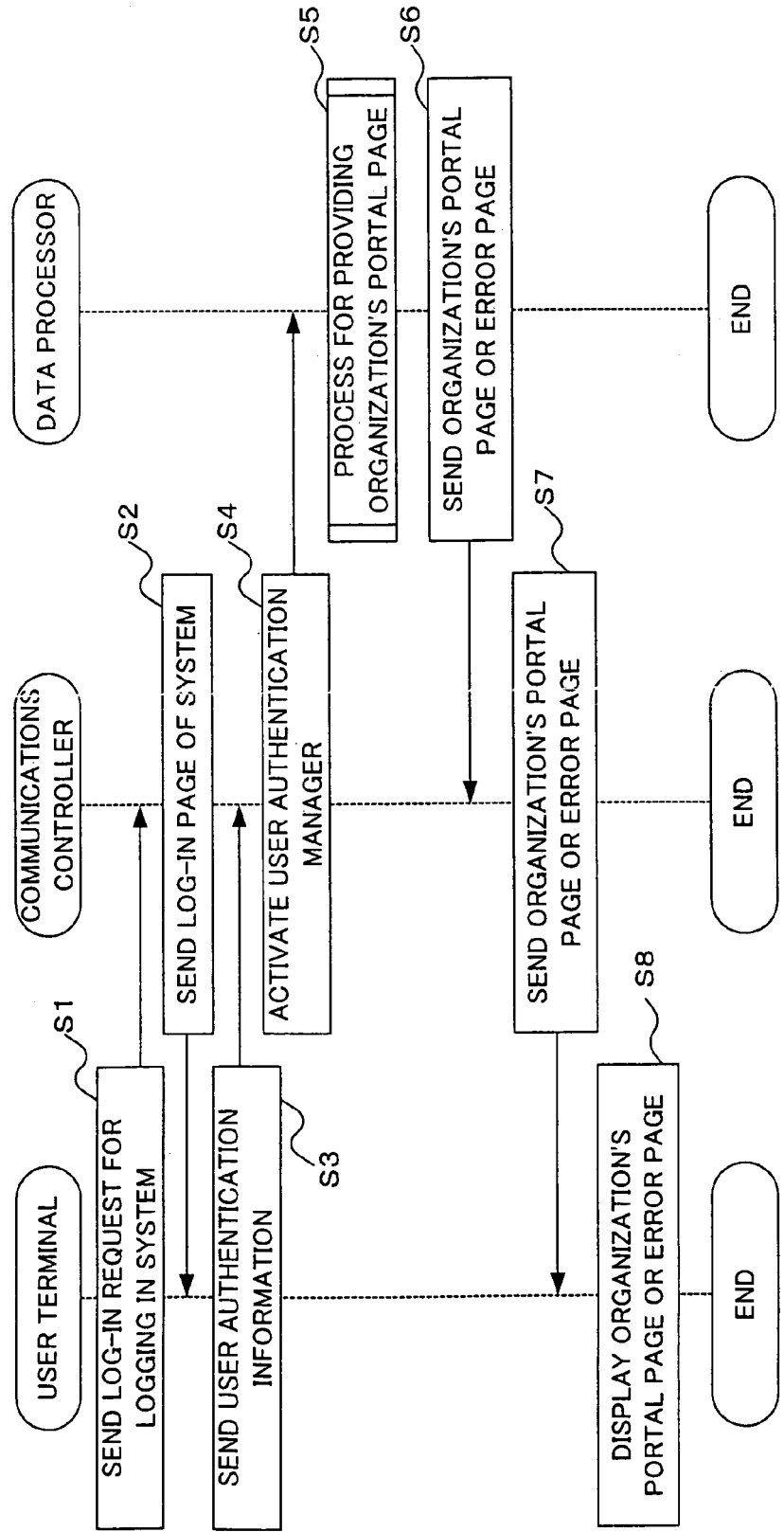
FIG. 13 is a diagram for explaining procedures which are carried out, up until the organization's portal page is displayed on a user terminal.

The content providing method will now specifically be explained Explanations will now be made to procedures which are executed since the user logs in the Web-content providing system of this embodiment until the first organization's portal page is displayed on the user terminal 1. FIG. 13 is a diagram for explaining procedures which are carried out by the user terminal 1, the communications controller 2 and the data processor 3 since the user logs in the system until the first organization's portal page is displayed on the user terminal 1.

As shown in FIG. 13, the user sends a log-in request to the communications controller 2 through the network 100 to log in the Web-content providing system of this embodiment, using the user terminal 1 (Step S1). The communications controller 2 having received the log-in request from the user sends a log-in page of this system to the user terminal 1 (Step S2).

Figure 14:
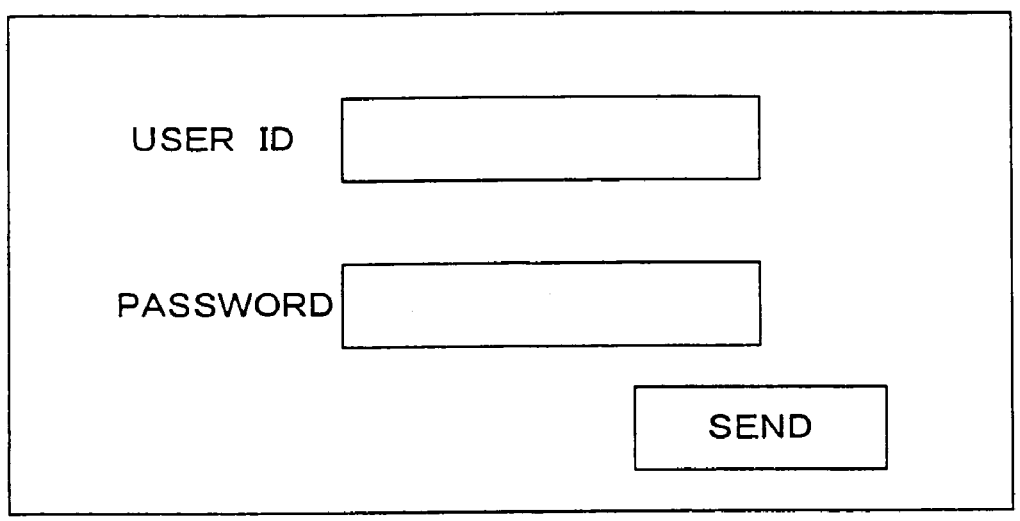
FIG. 14 is a diagram exemplarily showing a log-in page of the Web-content providing system.

The specific example of the log-in request for logging in this system may include a method of requesting the log-in by specifying a URL (Uniform Resource Locator), for example. Hence, according to such a method, the communications controller 2 acquires a log-in page corresponding to the specified URL from the content storage section 43 and sends the acquired log-in page to the user terminal 1. FIG. 14 shows a specific example of the log-in page including: two fields for inputting a corresponding user ID and password; and a "send" button for sending the user authentication information including the input information to the communications controller 2 from the user terminal 1.

The user inputs his/her user ID and password on the log-in page displayed on the user terminal 1, and clicks on the "send" button, thereby sending the user authentication information to the communications controller 2 (Step S3). The user authentication information includes an identifier of the user authentication manager 31, the user ID and password input in the log-in page of FIG. 14.

Upon reception of the user authentication information, the communications controller 2 acquires an activation method for activating the user authentication manager 31 from the procedure-information storage section 41 based on its identifier. The communications controller 2 activates the user authentication manager 31 using the user ID and password as arguments (Step S4).

The activated user authentication manager 31 carries out a process for providing an organization's portal page (Step S5). In the process for providing an organization's portal page, the user who requests to log in the system of this embodiment is authenticated, and the organization's portal page immediately after the logging-in the system is managed to be generated. The user authentication manager 31 collates the user ID and password provided from the communications controller 2, with the information stored in the organization-definition-information storage section 42. In doing so, the user authentication manager 31 perform user authentication as to whether the log-in requester is a proper user.

In the case where it is determined that the user is a proper user, the user authentication manager 31 causes the organization's portal generator 32 to generate an organization's portal page, and sends the generated organization's portal page to the communications controller 2 (Step S6), thereby managing the generation of the organization's portal page immediately after the user's log-in to the system.

On the contrary, in the case where it is determined that the user is not a proper user, the user authentication manager 31 acquires an error page representing a failure in the user authentication from the content storage section 43, and sends the acquired error page to the communications controller 2 (Step S6), thereby managing the generation of the organization's portal page to be displayed immediately after the user's log-in to the system.

The communications controller 2 sends the received organization's portal page or error page to the user terminal 1 through the network 100 (Step S7). The user terminal 1 displays the received organization's portal page or error page (Step S8).

Figure 15:
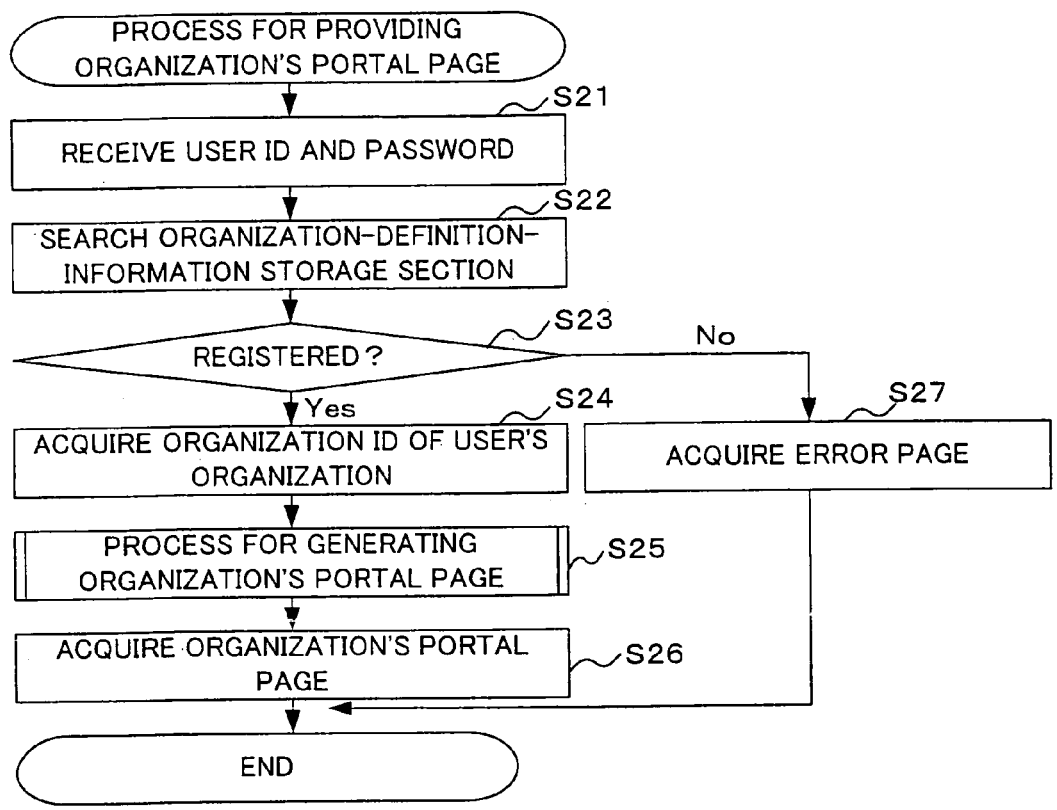
FIG. 15 is a flowchart for explaining a process for providing an organization's portal page.
Figure 16:
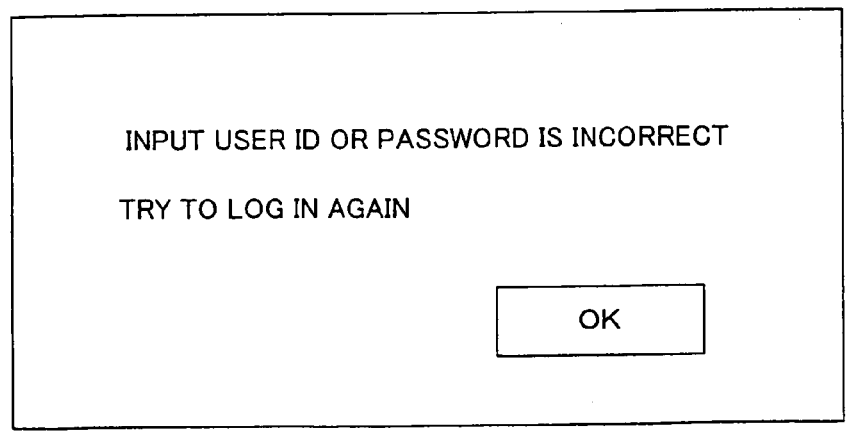
FIG. 16 is a diagrams exemplarily showing an error page showing a failure in user authentication.

The process for providing an organization's portal page will Dow be described in more detail. FIG. 15 is a flowchart for explaining the process for providing an organization's portal page, to be carried out by the user authentication manager 31.

The user authentication manager 31 receives the user ID and password as arguments at the time of activation (Step S21), Then, the user authentication manager 31 searches the organization-definition-information storage section 42 for the user having the received user ID and password (Step S22), and determines whether there is registered a user having the received user ID and password (Step S23).

In the case where it is determined that a corresponding user is registered in the organization-definition-information storage section 42 (Step S23: Yes), the user authentication manager 31 acquires the organization ID of the user's organization from the organization-definition-information storage section 42 (Step S24). The user authentication manager 31 activates the organization's portal generator 32 using the user ID and the organization ID of the user's organization as arguments, and controls the organization's portal generator 32 to execute a process for generating an organization's portal page, as will be explained later (Step S25). For example, in the case where the user having the user ID "X04" specifies a proper password and sends a request for user authentication, the user authentication manager 31 acquires "ORG04" corresponding to the "section A1" as the organization ID of the user's organization, The user authentication manager 31 activates the organization's portal generator 32 using "X04" and "ORG04" as arguments, so that an organization's portal page is generated by the organization's portal generator 32. The user authentication manager 31 acquires the generated organization's portal page (Step S26), and now completing the process for providing the organization's portal page.

On the contrary, in the case where it is determined that no corresponding user is registered in the organization-definition-information storage section 42 (Step S23: No), the user authentication manager 31 acquires an error page representing a failure in the user authentication from the content storage section 43 (Step S27), and terminating the process for providing the organization's portal page.

Figure 17:
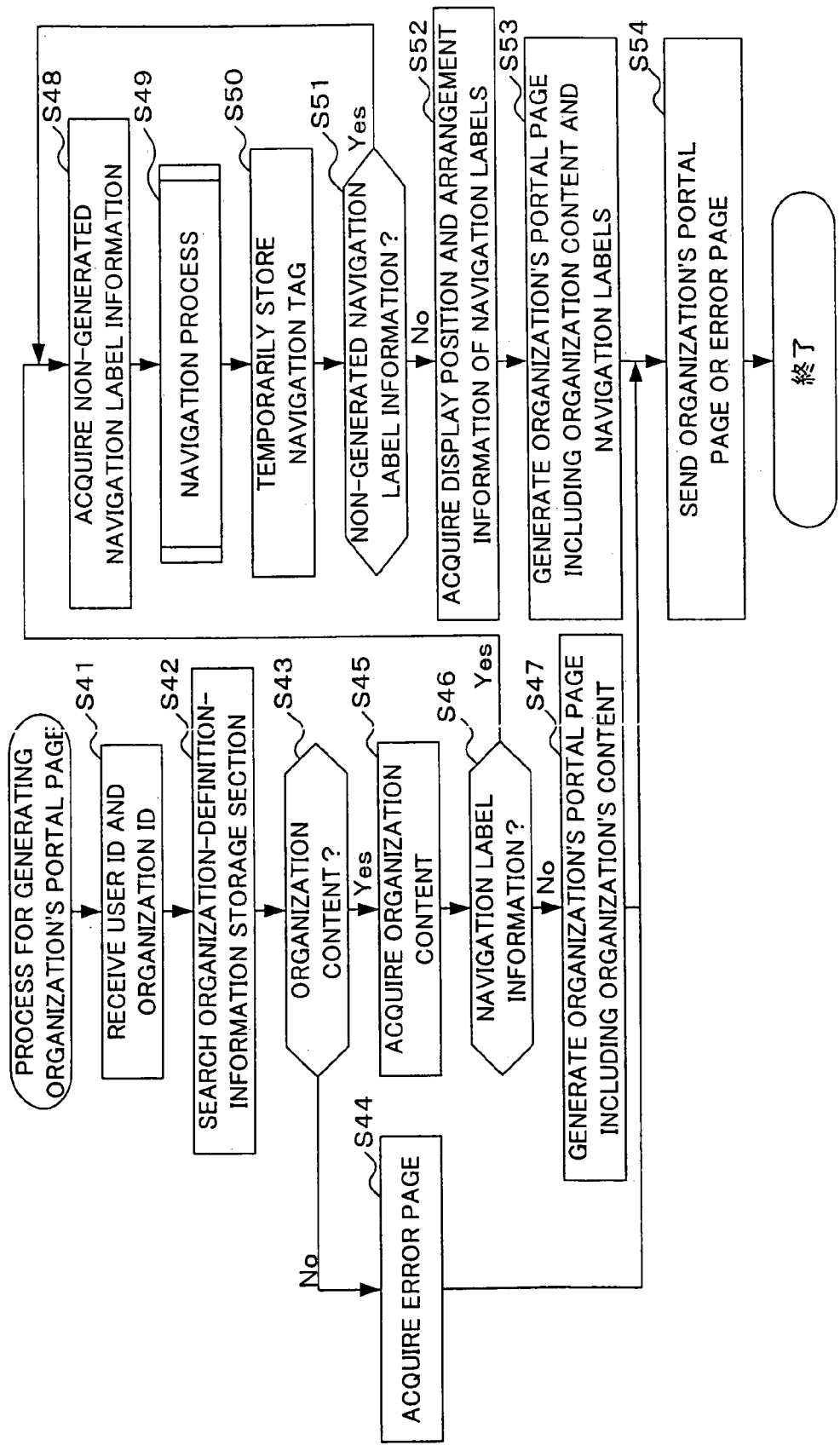
FIG. 17 is a flowchart for explaining a process for generating, an organization's portal page.

Explanations will now be made to the process for generating an organization's portal page. FIG. 17 is a flowchart for explaining the process for generating an organization's portal page, which is executed by the organization's portal generator 32.

The organization's portal generator 32 receives the user ID and organization ID as arguments at the time of activation (Step S41). Then, the organization's portal generator 32 searches the organization-definition-information storage section 42 for an address of an organization content corresponding to the received organization ID (Step S42), and determines whether the organization content is registered therein (Step S43).

In the case where it is determined that there is no corresponding organization content (Step S43: No), the organization's portal generator 32 acquires a default content page (an error page) representing that the organization content is not registered from the content storage section 43, as shown in FIG. 18 (Step S44), sends the acquired error page to the user authentication manager 31 (Step S54), and completes the process for generating the organization's portal pages.

On the contrary, in the case where it is determined that there is a corresponding organization content (Step S43: Yes), the organization's portal generator 32 acquires the organization content from the content storage section 43 (Step S45).

The organization's portal generator 32 determines whether information (navigation label information) regarding navigation labels is registered in the navigation-label-information storage section 44 (Step S46).

In the case where it is determined that no navigation label information exists (Step S46: No), the organization's portal generator 32 generates an organization's portal page including the organization content (Step S47), sends the generated organization's portal page to the user authentication manager 31 (Step S54), completing the process for generating organization's portal page.

On the contrary, in the case where it is determined that the navigation label information is registered (Step S46: Yes), the organization's portal generator 32 acquires information (non-generated navigation label information) regarding non-generated navigation labels from the navigation-label-information storage 44 (Step S48). The organization's portal generator 32 activates, the navigation generator 33 using the type of navigation labels, the display style thereof, the user ID and the organization ID as arguments, and causes the navigation generator 33 to perform a navigation process, as will be explained in more detail later (Step S49).

During the navigation process, the navigation generator 33 generates one or more navigation tags, and sends the generated navigation tags to the organization's portal generator 32. Upon reception of the navigation tags from the navigation generator 33, the organization's portal generator 32 temporarily stores the received navigation tags (Step S50).

Then, the organization's portal generator 32 determines whether the non-generated navigation label information is stored in the navigation-label-information storage section 44 (Step S51).

In the case where it is determined that the non-generated navigation label information exists in the navigation-label-information storage section 44 (Step S51: Yes), the organization's portal generator 32 repeats the procedures of the steps S48 to S50.

On the contrary, in the case where it is determined that the non-generated navigation label information does not exist (Step S51: No), the organization's portal generator 32 acquires the display position and arrangement of the navigation labels from the navigation-label-information storage section 44 (Step S52). After this, the organization's portal generator 32 combines the temporarily-stored navigation tag, the acquired display position and arrangement of the navigation labels and the organization content altogether, thereby generating an organization's portal page including the organization content and navigation labels (Step S53) Then, the organization's portal generator 32 sends the generated organization's portal page to the user authentication manager 31 (Step S54), and hence terminating the process for generating an organization's portal page.

The navigation process will now be explained with reference to FIG. 19 which shows a flowchart for explaining the navigation process carried out by the navigation generator 33.

The navigation generator 33 receives information representing the type of navigation labels, the display style of the labels, the user ID, the organization ID corresponding to the organization content to be displayed on the organization's portal page as arguments at the activation (Step S61). The navigation generator 33 determines whether the navigation labels are organization navigation labels or organization-hierarchy linking labels based on the received information (Step S62), and determines to perform the following processes, depending on the type of navigation labels.

In the case where the labels are the organization navigation labels, the navigation generator 33 acquires the user's organization and its organization ID from the organization-definition-information storage section 42, using the received user ID as an argument (Step S63). Then, the navigation generator 33 generates a navigation tag including a label of an organization name, in accordance with the display style as the argument (Step S64). Subsequently, the navigation generator 33 determines the organization, which is one level higher in hierarchy than the organization corresponding to the generated navigation tag, is registered (exists) in the organization-definition-information storage section 42 (Step S65).

In the case where it is determined that the organization, which is one level higher than the corresponding organization, is registered (Stop S65: Yes), the navigation generator 33 acquires its organization name and organization ID from the organization-definition-information storage section 42 (Step S66), and the flow returns to the procedure of the step S64 wherein a navigation tag is to be generated. In repeatedly performing the procedures of the steps S64 to S66, the navigation tags corresponding to the organizations, including the user's organization to the uppermost organization, can be generated.

On the contrary, in the case where it is determined that there is no organization, which is one-level higher than the corresponding organization (Step S65.: No), the navigation generator 33 sends the so-far generated navigation tags to the organization's portal generator 32 (Step S67), and thus completing the navigation process.

In the case where it is determined that the labels are the organization-hierarchy linking labels, the navigation generator 33 determines whether the organization, which is one-level higher than the organization corresponding to the organization ID received as an argument, is registered in the organization-definition-information storage section 42 (Step S68).

In the case where it is determined that the one-level higher organization is registered (Step S68: Yes), the navigation generator 33 acquires its organization name and organization ID from the organization-definition-information storage section 42 (Step S69). Then, the navigation generator 33 generates a navigation tag including a label of the acquired organization name and an anchor attached under the tag, in accordance the display style specified as the argument (Step S70).

On the contrary, in the case where it is determined that there is no organization which is one-level higher than the organization corresponding to the generated navigation tag (Step S68: No), the flow advances to the procedure of the step S71.

The navigation generator 33 acquires the organization name corresponding to the organization ID received as an argument, from the organization-definition-information storage section 42 using the received organization ID (Step S71), and generates a navigation tag including the organization name label in accordance with the display style specified as an argument (Step S72).

Then, the navigation generator 33 determines whether the organization, which is one-level lower in hierarchy than the organization corresponding to the organization ID as an argument and whose corresponding navigation tag has not been generated yet, is registered in the organization-definition-information storage section 42 (Step S73).

In the case where it is determined that the organization, which is one-level lower than the corresponding ID and does not correspond to any navigation tag, exists (Step S73: Yes), the navigation generator 33 acquires the name of the one-level lower organization and its organization ID from the organization-definition-information storage section 42 (Step S74), and generates a navigation tag including the label of the acquired organization name (of the one-level lower organization) and an anchor attached thereunder in accordance with the display style (Step S75). Then, the navigation generator 33 returns to the procedure of the step S73, wherein it is determined whether there is the organization, which is one-level lower than the organization corresponding to the received organization ID as an argument and whose corresponding navigation tag has not been generated. The procedures of the steps S73 to S75 are repeated, up until there will not be organization which is one-level lower than the organization corresponding to the received organization ID as an argument, or until the navigation tag will be generated for the entire one-level lower organization(s).

In the case where there is no such a one-level lower organization whose navigation tag has not yet been generated, i.e. each one-level lower organization corresponds to a navigation tag (Step S73: No), the navigation generator 33 sends the so-far generated navigation tags to the organization's portal generator 32 (Step S67), and thus completing the navigation process.

Figure 20D:
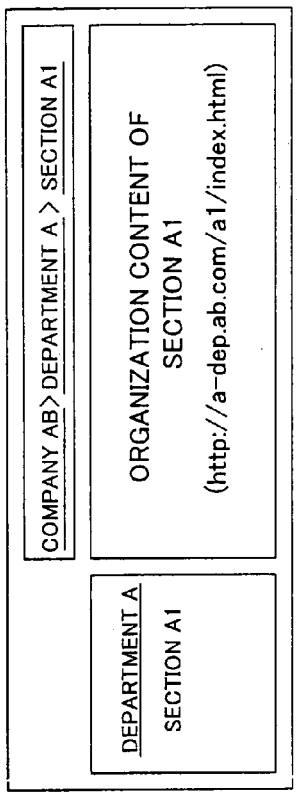
FIGS. 20A to 20E are diagrams each showing an organization's portal page which is displayed immediately after a corresponding user logs in the system of FIG. 1.
Figure 20E:
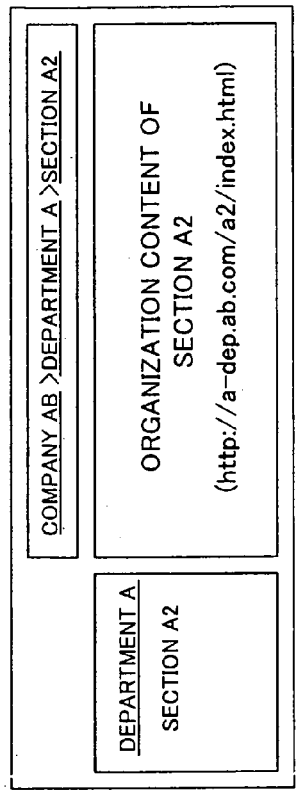
Figure 20A:
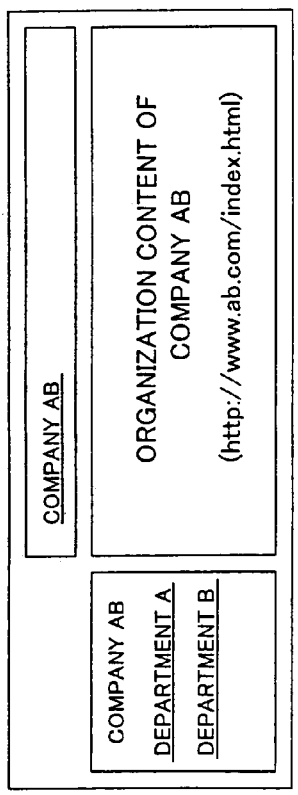
Figure 20B:
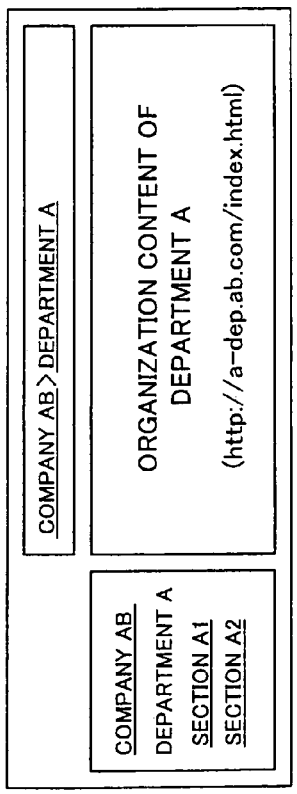
Figure 20C:
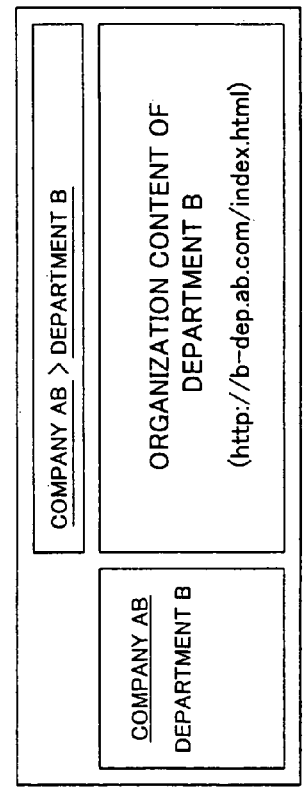

FIGS. 20A to 20E are diagrams each showing an organization's portal page which is displayed immediately after the user logs in the system of this embodiment, in the case where information regarding the display style, etc. of the navigation labels as shown in FIG. 11 is registered in the navigation-label-information storage section 44. Particularly, FIG. 20A shows thee organization's portal page displayed right after the user having the user ID of "X01" logs in the system, FIG. 20B shows the organization's portal page displayed right after the user having the user ID of "X02" logs in the system, FIG. 20C shows the organization's portal page displayed right after the user having the user ID of "X03" logs in the system, FIG. 20D shows the organization's portal page displayed right after the user having the user ID of "X04" logs in the system, and FIG. 20E shows the organization's portal page displayed right after the user having the user ID of "X05" logs in the system.

The organization's portal page of FIG. 20A shows an organization content of the "company AB". In this page, the organization navigation label is displayed in an upper area right above the organization content, and the organization-hierarchy linking labels are displayed in an area left beside the organization content. Since, there is no higher-level organization above the "company AB" that the user "X01" directly belongs to, the label of "company AB" is only one organization navigation label displayed. Because the organization's portal page shows the organization content of the "company AB", the organization-hierarchy linking labels are: the label or "company AB" without any anchor attached thereunder; and the labels "department A" and "department B" with an anchor attached thereunder which are both lower in hierarchy than the "company AB" by one level.

FIG. 20B shows the organization's portal page which is displayed right after the user "X02" logs in the system. The process for providing an organization's portal page will now specifically be described, in the case where the user "X02" logs in the system, for example.

As shown in FIG. 11, the navigation-label-information storage section 44 stores navigation label information, which comprises one or more organization navigation labels (first navigation information) and one or more organization-hierarchy linking labels (second navigation information).

In the case where the user "X02" logs in the systems of this embodiment, the user authentication manager 31 acquires the user ID of "X02" and the organization ID of "RG02", as arguments (Step S24 in FIG. 15). Then, the user authentication manager 31 activates the organization's portal generator 32, and causes the organization's portal generator 32 to carry out the process for generating the organization's portal page (Step S25 in FIG. 15).

The organization's portal generator 32 acquires an organization content which can be specified by an address of "http://a-dep.ab.com/index.html" from the content storage section 43 (Step S45 in FIG. 17).

The organization's portal generator 32 acquires the first navigation label information (Step S48, FIG. 17), and sets arguments of "organization navigation labels" as the type of labels, "horizontal" as the display style, "X02" as the user ID and "ORG02" as the organization ID. Then, the organization's portal generator 32 activates the navigation generator 33, and causes the activated navigation generator 33 to carry out the navigation process (Step S49 in FIG. 17).

Figure 19:
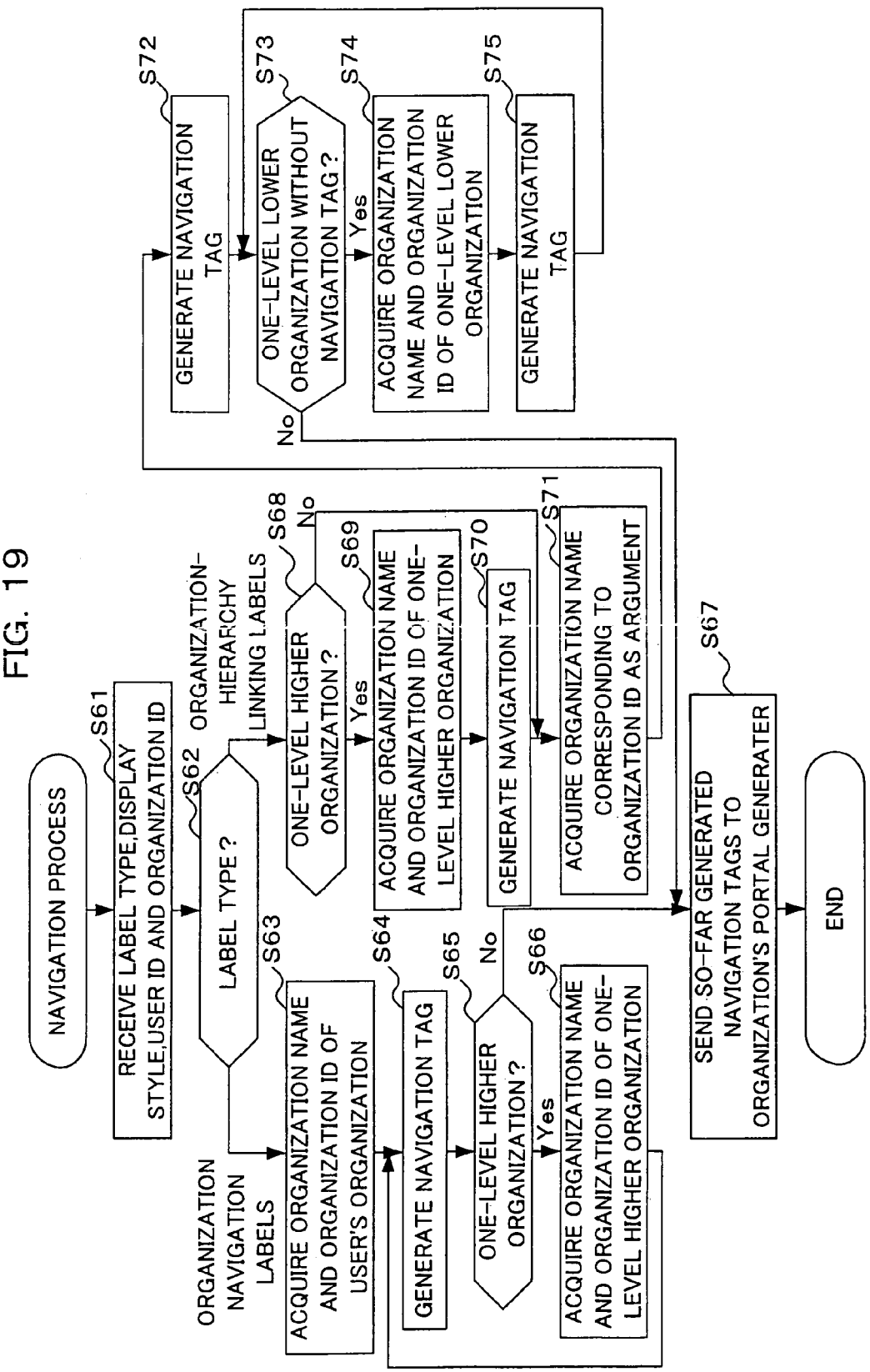
FIG. 19 is a flowchart for explaining a navigation process.

Upon this, the navigation generator 33 determines that the labels are the organization navigation labels (Step S62 in FIG. 19), and sets the "section A" as the organization name of the user's organization and "ORG02" as the organization ID (Step S63 in FIG. 19). The navigation generator 33 generates a navigation tag, including a label of "section A" with an anchor of "ab.servlet.portalGen, OID=ORG02, UID=X02" (Step S64 in FIG. 19).

Because the "company AB" whose organization ID is "ORG01" is an organization which is higher in hierarchy by one level than the organization (the section A) with the organization ID of "ORG02" corresponding to the generated navigation tag (Step S65: Yes in FIG. 19), the navigation generator 33 generates a horizontal-direction navigation tag, including the label "company AB" with an anchor "ab.servlet.portalGen, OID=AORG01, UID=X02" (Steps S66 and S64 in FIG. 19). Since, there is no organization higher than the organization (company AB) with the organization ID) of "ORG01" corresponding to the generated navigation tag (Step S65: No in FIG. 19), the navigation generator 33 sends the so-far generated navigation tags to the organization's portal generator 32 (Step S67 in FIG. 19), and thus completing the navigation process. The organization's portal generator 32 temporarily stores the received tags (Step S50 in FIG. 17).

As shown in FIG. 11, in this embodiment, because there is the non-generated navigation label information (the second navigation label information) in the navigation label-information storage section 44 (Step S51: Yes in FIG. 17), the organization's portal generator 32 acquires the navigation label information, shown in the lower section of the table shown in FIG. It (Step S48 in FIG. 17). After this, the organization's portal generator 32 sets arguments, that are the "organization-hierarchy linking labels" as the type of labels, "vertical" as the display style, "X02" as the user ID and "ORG02" as the organization ID, and activates the navigation generator 33 using the set arguments. The organization's portal generator 32 causes the activated navigation generator 33 to carry out the navigation process (Step S49 in FIG. 17).

The navigation generator 33 determines that the type of labels are the organization-hierarchy linking labels (Step S62 in FIG. 19). There is the organization (the company AB) one level higher than the organization (the department A) corresponding to the organization ID of "ORG02" (Step S68: Yes in FIG. 19). Hence, the navigation generator 33 generates a vertical navigation tag including a label "company AB" with an anchor "ab.servlet.portalGen, OID=ORG01, UID=X02" (Steps S69 and S70 in FIG. 19).

The navigation generator 33 generates a vertical navigation tab including a label "department A" with no anchor attached thereunder (Steps S71 and S72 in FIG. 19).

Because there are the "section A1" and the "section A2" which are lower in hierarchy by one level than the "department A" (Step S73: Yes in FIG, 19), the navigation generator 33 generates two vertical navigation tags. Specifically, the navigation generator 33 generates a vertical navigation tag, including a label "section A1" with an anchor "ab.servlet.portalGen, OID=ORG04, UID=X02", and another vertical navigation tab, including a label "section A2" with an anchor "ab.servlet.portalGen, OID=ORG05, UID=X02" (Steps S74 and S75 in FIG. 19). Then, the navigation generator 33 sends the generated navigation tags to the organization's portal generator 32 (Step S67 in FIG. 19), and hence completing the navigation process.

Upon reception of the generated navigation tags from the navigation generator 33, the organization's portal generator 32 temporarily stores the received navigation tags (Step S50 in FIG. 17).

Since the two navigation labels registered in the table shown in FIG. 11 are completely generated (Step S51: No in FIG, 17), the organization's portal generator 32 acquires the display position and arrangement of the navigation labels from the navigation-label-information storage ,section 44 (Step S52 in FIG. 17). The organization's portal generator 32 combines the organization content with the navigation labels so as to generate the organization's portal page shown in FIG. 20B (Step S53 in FIG. 17).

Specifically, the organization's portal generator 32 arranges the "organization navigation labels" in an upper area above the organization content, the horizontal arrangement is left-justified, and the vertical arrangement is center-justified. Further, the organization's portal generator 32 arranges the "organization-hierarchy linking labels" in the area left beside the organization content, the horizontal arrangement is left-justified and the vertical arrangement is upward-justified. Then, the organization's portal generator 32 sends the generated organization's portal page to the user authentication manager 31 (Step S54 in FIG. 17).

The user authentication manager 31 sends the received organization's portal page (Step S82 in FIG. 15) to the communications controller 2 (Step S6 in FIG. 13). Upon reception of the organization's portal page from the user authentication manager 31, the communications controller 2 sends the received organization's portal page to the user terminal 1 (Step S7 in FIG. 13). Upon this, the organization's portal page of FIG. 20B is displayed on the user terminal 1 (Step S8 in FIG, 13).

FIG. 20C shows the organization's portal page displayed Tight after the user "X03" logs in the system. In the page shown in FIG. 20C, the organization content of the "department B" is shown. In this pages the organization navigation labels are displayed in the upper area above the organization content, and organization-hierarchy linking labels are displayed in the area left beside the organization content. Because the "company AB" is higher in hierarchy than the user's organization of the "department B" by one level, the labels "company AB" and "department B" are the organization navigation labels. Because the organization's portal page shows the organization content or the "department B", the label "company AB" with an anchor attached thereunder and the label "department B" with no anchor are displayed as the organization-hierarchy linking labels.

FIG. 20D shows the organization's portal page displayed right after the user "X04" logs in the system. In this page, as shown in FIG. 20D, the organization content of the "section A1", is shown. Further, in this page, the organization navigation labels are displayed in the upper area above the organization content, while the organization-hierarchy linking labels are displayed in the area left beside the organization content. Because the "department A" and the "company AB" are ill higher levels in hierarchy than the level of the "section A1" as the user organization, the labels of the "company AB", the "department A" and the "section A1" are displayed as the organization navigation labels. Because the organization content of the "section A1" is displayed in the organization's portal page, the organization-hierarchy linking labels include the label of the "department A", which is one-level higher than the "section A1" and includes an anchor attached thereunder and the label of the "section A1" with no anchor.

FIG. 20E shows the organization portal page displayed right after the user "X05" logs in the system. In the page shown in FIG. 20E, the organization content of the "section A2" is shown. In this page, the organization navigation labels are displayed in the upper area above the organization content, while the organization-hierarchy linking labels are displayed in the area left beside the organization content. Because the "department A" and the "company AB" are the organizations which are in higher levels than the level of the "section A2" of the user's organization, the organization navigation labels include the label "company AB", the "department A" and the "section A2". In this organization's portal page, the organization content of the "section A2" is displayed, the organization-hierarchy linking labels include the label of the "department A", which is one-level higher than the "section A2" and includes an anchor attached thereunder, and the label of the "section A2" with no anchor attached thereunder.

Explanations will now be made to operations, in the case where the user travels between the organization contents through operation of the navigation labels prepared in the organization's portal page and refers to various organization contents. FIG. 21 is a diagram for explaining procedures to be performed by the user terminal 1, the communications controller 2, and the data processor 3, in the case where the user travels between the organization contents of (he system of this embodiment, through the operation of the navigation labels included in the operation's portal page.

As shown in FIG. 21, the user operates the navigation labels included in the organization's portal page, using the user terminal 1 (Step S81). The user terminal 1 sends a navigation request to the communications controller 2 through the network 100 (Step S82). In this case, the user can select an arbitrary one label with an anchor attached thereunder, from a plurality of navigation labels displayed in the organization's portal page. For example, upon selection of a label having an organization name, information of the anchor set in combination with the label is sent to the communications controller 2 from the user terminal 1. Note that the anchor includes an identifier of the organization's portal generator 32, the organization ID corresponding to the label and the user ID of the user.

The communications controller 2 having received the navigation request from the user acquires an execution method of executing the organization's portal generator 32 from the procedure-information storage section 41, based on the identifier. Then, the communications controller 2 activates the organization's portal generator 32 using the user ID and organization ID as arguments (Step S83).

The activated organization's portal generator 32 carries out the above-described process for generating an organization's portal page (Step S84), thereby generating an organization's portal page. Then, the organization's portal generator 32 sends the generated organization's portal page to the communications controller 2 (Step S85).

The communications controller 2 sends the received organization's portal page to the user terminal 1 through the network 1 no (Step S86). The user terminal 1 displays the received organization's portage page (Step S87).

FIGS. 22A to 22D show organization's portal pages which are displayed right after the user "X04" logs in the system. More specifically, each of the organization's portal pages is displayed, after the user logs in the system and travels between the organization contents through the operation of the navigation labels, in the case where information regarding the display style, etc. of the navigation labels shown in FIG. 11 is registered in the navigation-label-information storage section 44.

Figure 22A:
FIGS. 22A to 22D are diagrams each showing an organization's portal page displayed when the user travels between organization contents using organization navigation labels.

FIG. 22A shows an organization's portal page displayed right after the user "X04" logs in the system of this embodiment.

In the organization's portal page of FIG. 22A, if the user selects (clicks on) the "department A" included in the organization navigation labels (Stop S81 in FOG. 21), information within an anchor (a navigation request) corresponding to the label "department A" is sent from the user terminal 1 to the communications controller 2 (Step S82 in FIG. 21). As shown in FIG. 9, the anchor of the label "department A" includes information of "ab.servlet.portalGen", OID=ORG02, UID=X04" set under the label.

Upon reception on the navigation request "ab.servlet.portalGen, OID=ORG02, UID=X04", the communications controller 2 acquires the execution method of executing the organization's portal generator 32 from the procedure-information storage section 41, using the identifier "ab.servlet.portalGen", sets "X04" as the user ID and "ORG02" as the organization ID as arguments, and activates the organization's portal generator 32 (Step S83 in FIG,. 21).

The organization's portal generator 32 acquires an organization content specified by the address of "http://a-dep.ab-.com/index.html" from the content storage section 43 (Step S45 in FIG. 17).

The organization's portal generator 32 acquires the navigation label information (the first navigation label information) as shown in FIG. 11 (Step S48 in FIG. 17), and sets arguments of "organization navigation labels" as the type of labels, "horizontal" as the display style, "X04" as the user ID and "ORG02" as the organization ID. Then, the organization's portal generator 32 controls the navigation generator 32 to execute the navigation process (Step S49 in FIG. 17).

The navigation generator 33 determines that the labels are "organization navigation labels" (Step S62 in FIG. 19), and acquires "section A1" as the organization name of the user's organization and "ORG04" as the organization ID (Step S63 in FIG. 19). Then, the navigation generator 33 generates a horizontal navigation tag including a label "section A" and an anchor "ab.servlet.portalGen, OID=ORG04, UID=X04" (Step S64 in FIG. 19).

"Department A" having the organization ID "ORG02" and "company AB." having the organization ID "ORG01" are the organizations which are higher in level than "section A1" having the organization ID of "ORG04" (Step S65; Yes in FIG. 19). Because of this, the navigation generator 33 generates a horizontal navigation tag including a label "department A" and an anchor "ab.servlet.portalGen, OID=ORG02, UID=X04" and another horizontal navigation tag including a label "company AB" and an anchor "ab.servlet.portalGen, OID=ORG01, UID=X04" (Steps S64 and S66 in FIG. 19). The navigation generator 33 sends the so-far generated navigation tags entirely to the organization's portal generator 32 (Step S67 in FIG. 19), and completes the navigation process. The organization's portal generator 32 temporarily stores the received navigation tags (Step S50 in FIG. 17).

The organization's portal generator 32 acquires the navigation label information (the second navigation label information), as shown in FIG. 11 (Step S48 in FIG. 17). The organization's portal generator 32 sets arguments that are "organization-hierarchy linking label" as the type of labels, "vertical" as the display style, "X04" as the user ID, "ORG02" as the organization ID, and activates the navigation generator 33 to perform the navigation process (Step S49 in FIG. 17).

The navigation generator 33 determines that the labels are the "organization-hierarchy linking labels" (Step S62 in FIG. 19), There is the organization, "company AB", with the organization ID of "ORG02" in a higher level than the level of the organization, "department A", in hierarchy (Step S68 in FIG. 19). Then, the navigation generator 33 generates a vertical navigation tag including a label "company AB" and an anchor "ab.servlet.portalGen, OID=ORG01, UID=X04" (Steps S69 and 70 in FIG. 19).

The navigation generator 33 generates a vertical navigation tag including a label "department A" with no anchor (Steps S71 and S72 in FIG. 19).

There are "section A1" and "section A2" in a lower level than the level of "department A" by one level in hierarchy (Step S73: Yes in FIG. 19). Hence, the navigation generator 33 generates a vertical navigation label including a label "section A1" and an anchor "ab.servlet.portalGen, OID=ORG04, UID=X04" and another vertical navigation tag including a label "section A2" and an anchor "ab.servlet.portalGen, OID=ORG05, UID=X04" (Steps S74 and S75 in FIG. 19). The navigation generator 33 sends the so-far generated navigation tags entirely to the organizations portal generator 32 (Step S67 in FIG. 19), and hence completing the navigation process. The organization,'s portal generator 32 temporarily stores the received navigation tags (Step S50 in FIG. 17).

Because the two navigation labels registered in the table shown in FIG. 11 are completely generated (Step S51: No in FIG. 17), the organization's portal generator 32 acquires the display position and arrangement information of the navigation labels from the navigation-label-information storage section 44 (Step S52 in FIG. 17). The organization's portal generator 32 set; the "organization navigation labels" in the upper area just above the organization content, the horizontal arrangement to be left-justified and the vertical arrangement to be center-justified. Further, the organization's portal generator 32 sets the "organization-hierarchy linking labels" in an area left beside the organization content, the horizontal arrangement to be left-justified and the vertical arrangement to be upper justified, so as generate the organization's portal pate shown in FIG. 22B (Step S53 in FIG. 17), The organization's portal generator 32 sends the generated organization's portal generator (Step S85 in FIG. 21).

The communications controller 2 sends the received organization's portal page to the user terminal 1. (Step S86 in FIG. 21). Upon this, the organization's portal page of FIG. 22B is displayed on the user terminal 1 (Step S87 in FIG. 21).

Figure 22C:
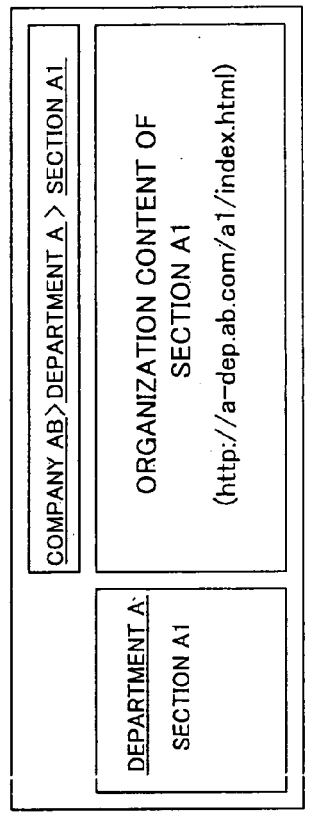
Figure 22B:
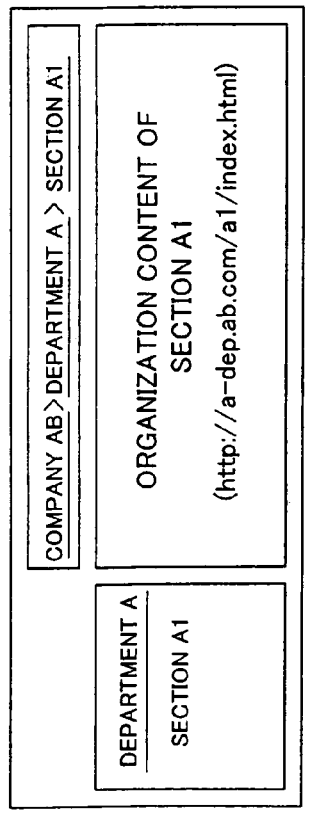

In the organization's portal page of FIG. 22B, if the user clicks on the organization navigation label "company AB" (Step S81 in FIG. 21), a navigation request of "ab.servlet-.portalGen, OID=ORG01, UID=X04" is sent from the user terminal 1 to the communications controller 2 (Step S82 in FIG. 21). The communications controller 2 sets an argument "X04" as the user ID and another argument "ORG01" as the organization ID, and activates the organization's portal generator 32 using the arguments (Step S83 in FIG. 21). In doing this, the above-described procedures of the steps shown in FIGS. 17 and 19 are successively executed, and the organization's portal page shown in FIG. 22C and having the organization content of the "company AB" is displayed on the user terminal 1.

Figure 22D:
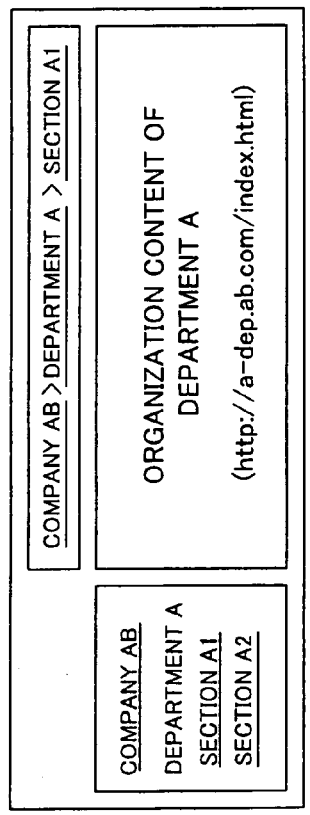

Subsequently, if the user clicks on "section A1" included in the organization-hierarchy navigation labels in the organization's portal page of FIG. 22C (Stop S81 in FIG. 21), a navigation request of "ab.servlet.portalGen, OID=ORG04; UID=X04" is sent from the user terminal 1 to the communications controller 2 (Step S82 in FIG. 21). The communications controller 2 sets an argument "X04" as the user ID and another argument "ORG04" as the organization ID, and activates the organization's portal generator 32 using the set arguments (Step S83 in RIG. 21). This realizes in executing the procedures of the steps shown in FIGS. 17 and 19 are successively executed, and the organizations portal page including the organization content of the "section A1" and shown in FIG. 22D is displayed on the user terminal 1.

FIGS. 23A to 23E are diagrams each showing an organization's portal page which is displayed when the user "X04" logs in the system, and thereafter travelling through organization contents using the organization-hierarchy linking labels. Particularly, such an organization's portal page is displayed in a case where information regarding the display style, etc. of the navigation labels shown in FIG. 11 is registered in the navigation-label-informational storage section 44.

Figure 23D:
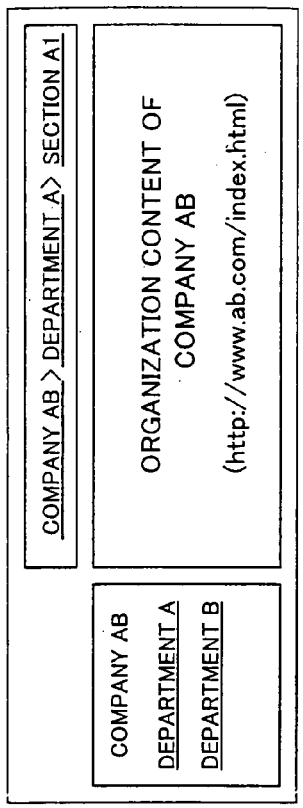
FIGS. 23A to 23E are diagrams each showing an organization's portal page displayed when the user travels between organization contents using organization-hierarchy linking labels.
Figure 23E:
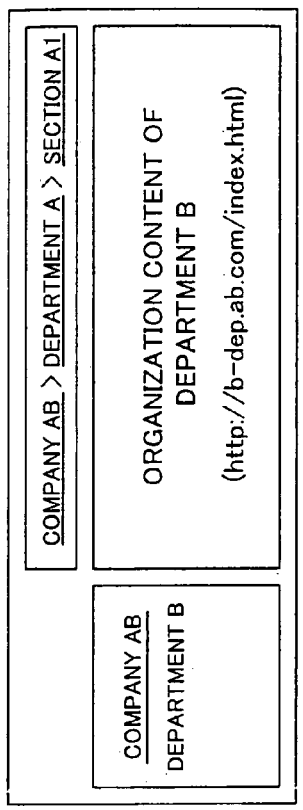
Figure 23A:
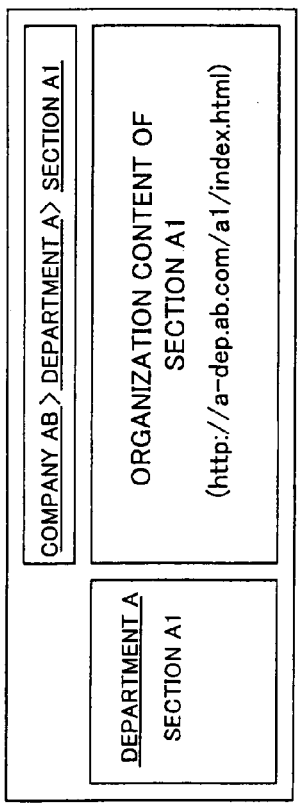

FIG. 23A shows an organization's portal page displayed immediately after tire user "X04" logs in the system of this embodiment. In (he organization's portal page of FIG. 23A, if the user clicks on the label "department A" included in the organization-hierarchy linking labels (Step S81 in FIG. 21), a navigation request of "ab.servlet.portalGen, OID=ORG02, UID=X04" is sent from the user terminal 1 to the communications controller 2 (Step S82 in FIG. 21). The communications controller 2 sets an argument of "X04" as the user ID and another argument of "ORG02" as the organization ID, and activates the organization's portal generator 32 using the set arguments (Step S83 in FIG. 21). Then, the procedures of the steps shown in FIGS. 17 and 19 are successively performed, and the organization's portal page including the organization content of the "department "A" and shown in FIG. 23B is displayed on the user terminal 1.

Figure 23B:
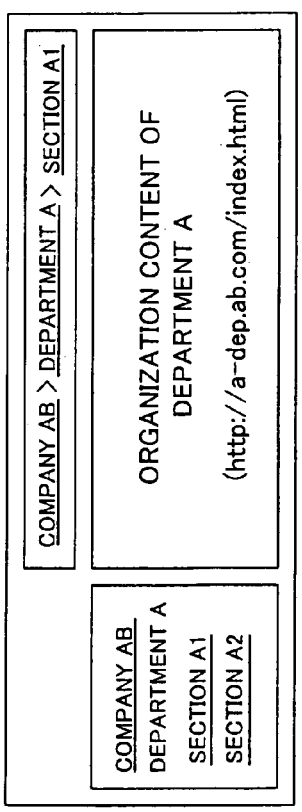

In the organization's portal page shown in FIG. 23B, if the user clicks on the label "section A2" included in the organization-hierarchy linking labels (Step S81 in FIG. 21), a navigation label of "ab.servlet.portalGen, OID=ORG05, UID=X04" is sent from the user terminal 1 to the communications controller 2 (Step S82 in FIG. 21). The communications controller 2 sets an argument of "X04" as the user ID and another argument of "ORG05" as the organization ID, and activates the organization's portal generator 32 using the arguments (Step S83 in FIG. 21). In doing so, the procedures of the steps shown in FIGS. 17 and 19 are successively performed, and the organization portal page including the organization content of the "section A2" and shown in FIG. 23C is displayed on the user terminal 1.

Figure 23C:
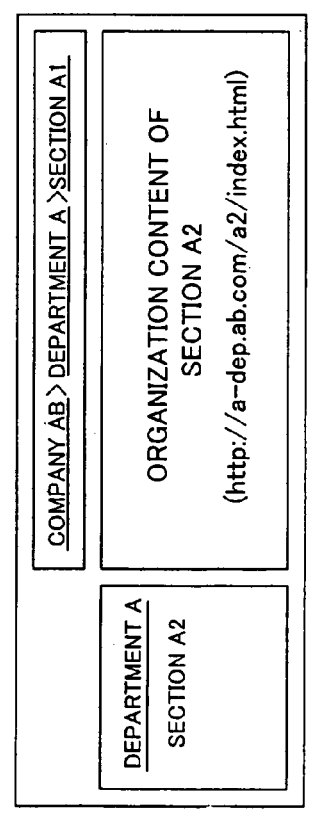

In the organization's portal Page shown in FIG. 23C, if the user clicks on the label "company AB" included in the organization-hierarchy linking labels (Step S81 in FIG. 21), a navigation request of "ab.servlet.portalGen, OID=ORG01, UID=X04" is sent from the user terminal 1 to the communications controller 2 (Step S82 in FIG. 21). The communications controller 2 then sets an argument of "X04" as the user ID and an argument of "ORG01" as the organization ID, and activates the organization's portal generator 32 using the arguments (Step S83 in FIG, 21). By so doing, the procedures of the steps shown in FIGS. 17 and 19 can be executed, and the organization's portal page including the organization content of the "company AB" and illustrated in FIG. 23D is displayed on the user terminal 1.

In the organization's portal page shown in FIG. 23D, if the user clicks on the label "department B" included in the organization-hierarchy linking labels (Step S81 in FIG. 21), the user terminal 1 sends a navigation request of "ab.servlet.portalGen, OID=ORG03, UID=X04" to the communications controller 2 (Step S82 in FIG. 21). The communications controller 2 sets an argument of "X04" as the user ID and another argument of "ORG03" as the organization ID, and activates the organization's portal generator 32 using the set arguments (Step S83 in FIG. 21). In doing so, the procedures of the steps shown in FIGS. 17 and 19 are successively performed, and the organization's portal page including the organization content of the "department B" and shown in FIG. 23B is displayed on the user terminal 1.

The Web-content providing system according to this embodiment can be realized using an internal computer device, etc. The operations of the user authentication manager 31, organization's portal generator 32, and navigation generator 33 are stored on a computer readable recording medium, in a computer-program format, for example, and this program is read out and executed by the computer device, thereby successfully performing the above-described processes. In this case, the computer readable recording medium includes a flexible disk, a magneto-optical disk, a CD-ROM, a DVD-ROM, a magnetic hard disk, a semiconductor memory, etc.

The preferred embodiment of the present invention has been described with reference to the accompanying drawings. However, the present invention is not limited to the above, and various embodiments ad changes may be made thereonto without departing from the broad spirit and scope of the invention.

As explained above, according to the Web-content providing system of the present invention, the organization definition information stored in the organization-definition-information storage section 42 includes addresses of organization contents, and the organization definition information and the organization contents are managed and incorporated with each other. Therefore, it is not necessary that the user store the individual address of each organization content, and can refer to the organization content of the user's organization only through the log-in to the system. Hence, suitable organization contents can be provided based on the user's organization. Accordingly, the suitable organization contents can automatically be provided to the user, aid the user can access the information necessary for his/her work as soon as possible, thereby improving the productivity in the long run. Further, the organization navigation labels are automatically generated in accordance with the organization definition information. Hence, the user can access the organization contents of the organizations that the user directly or indirectly belongs to, and can quickly collect any information necessary for his/her work.

In addition, according to the Web-content providing system of the present invention, an organization ID is used for identifying each organization content, instead of a Web page address. Hence, the creator or manager of the organization content can freely change the address of the organization content without bothering the user. Therefore, the address of each organization content can easily be managed. The work of Web-content creator or manager can be reduced, and the cost for transmitting or sharing the organization contents can remarkably be reduced.

Furthermore, the organization navigation labels and organization-hierarchy linking labels are automatically generated in accordance with the organization definition information. Hence, the user can travel between the organization contents, and the Web-content manager does not have to statically set the individual organization contents to include address information of target organization contents to which the user may intend to visit.

The system of the present invention can be realized by a general computer, without the need for a dedicated system. A program and data for controlling a computer to execute the above-described processes may be recorded on a medium (a flexible disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so) as to realize the system of the present invention.

The above-described embodiment is intended to illustrate the present invention, not to limit the scope of the present invention, The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-068394 filed on Mar. 12, 2001, and including specification, claims, drawings and summary. The disclosure of the above Japanese Patent Application is incorporated herein by reference in its entirety.

What is claimed is:

1. A web-content providing method in a web-content providing system, said method comprising:
    storing, by said web-content providing system, organization definition information, said organization definition information including: (i) hierarchical structure information about a hierarchical structure of a hierarchy of a plurality of organizations, (ii) names of users in association with respective organizations of said plurality of organizations of which they are members, and (iii) webpage addresses in association with corresponding organizations of said plurality of organizations;
    receiving, by said web-content providing system from a user terminal, a log-in request specifying a user name;
    determining, by said web-content providing system, a particular organization of said plurality of organizations that is associated with said user name based on said organization definition information;
    determining, by said web-content providing system, a particular webpage address that is associated with said particular organization based on said organization definition information;
    determining, by said web-content providing system, a first webpage address that is associated with a first organization that is one level higher than said particular organization in said hierarchy based on said organization definition information;
    determining, by said web-content providing system, a second webpage address that is associated with a second organization that is one level lower than said particular organization in said hierarchy based on said organization definition information;
    generating, by said web-content providing system, a portal page, said portal page including: (i) organization content obtained from a particular webpage at said particular webpage address, (ii) a first organization hierarchy linking label specifying a first link to said first webpage address, and (iii) a second organization hierarchy linking label specifying a second link to said second webpage address; and
    providing, by said web-content providing system, said portal page to said user terminal.

2. The method of claim 1, further comprising:
    receiving, by said web-content providing system from said user terminal, a request for second organization content at said second webpage address that is specified by said second link of said second organization hierarchy linking label;
    determining, by said web-content providing system, a third webpage address that is associated with a third organization that is one level lower than said second organization in said hierarchy based on said organization definition information;
    generating, by said web-content providing system, a second portal page, said second portal page including: (i) organization content obtained from a second webpage at said second web address, (ii) a particular organization hierarchy linking label specifying a particular link to said particular webpage address, and (iii) a third organization hierarchy linking label specifying a third link to said third webpage address; and
    providing, by said web-content providing system, said second portal page to said user terminal.

3. The method of claim 1,
    wherein said first organization hierarchy linking label and said second organization hierarchy linking label are positioned at a designated position on said portal page.

4. The method of claim 1,
    wherein said first organization hierarchy linking label and said second organization hierarchy linking label are arranged on said portal page in at least one of a horizontal configuration and a vertical configuration.

5. A web-content providing system, comprising:
    an organization definition information storage section for storing organization definition information, said organization definition information including: (i) hierarchical structure information about a hierarchical structure of a hierarchy of a plurality of organizations, (ii) names of users in association with respective organizations of said plurality of organizations of which they are members, and (iii) webpage addresses in association with corresponding organizations of said plurality of organizations;
    a user authentication manager for receiving a log-in request specifying a user name that is transmitted from a user terminal, and for determining a particular organization of said plurality of organizations that is associated with said user name based on said organization definition information stored in said organization definition information storage section;

a navigation generator for determining, based on said organization definition information stored in said organization definition information storage section, a first webpage address that is associated with a first organization that is one level higher than said particular organization determined by said user authentication manager in said hierarchy and a second webpage address that is associated with a second organization that is one level lower than said particular organization determined by said user authentication manager in said hierarchy, and for generating a first organization hierarchy linking label specifying a first link to said first webpage address and a second organization hierarchy linking label specifying a second link to said second webpage address; and an organization portal generator for determining, based on said organization definition information stored in said organization definition information storage section, a particular webpage address that is associated with said particular organization determined by said user authentication manager, and for generating a portal page, said portal page including: (i) organization content obtained from a particular webpage at said particular webpage address, (ii) said first organization hierarchy linking label generated by said navigation generator, and (iii) said second organization hierarchy linking label generated by said navigation generator, and for providing said portal page to said user terminal.

6. A storage medium storing a program for causing a computer to execute a process, said process comprising:

storing organization definition information, said organization definition information including: (i) hierarchical structure information about a hierarchical structure of a hierarchy of a plurality of organizations, (ii) names of users in association with respective organizations of said plurality of organizations of which they are members, and (iii) webpage addresses in association with corresponding organizations of said plurality of organizations;

receiving, from a user terminal, a log-in request specifying a user name;

determining a particular organization of said plurality of organizations that is associated with said user name based on said organization definition information;

determining a particular webpage address that is associated with said particular organization based on said organization definition information;

determining a first webpage address that is associated with a first organization that is one level higher than said particular organization in said hierarchy based on said organization definition information;

determining a second webpage address that is associated with a second organization that is one level lower than said particular organization in said hierarchy based on said organization definition information;

generating a portal page, said portal page including: (i) organization content obtained from a particular webpage at said particular webpage address, (ii) a first organization hierarchy linking label specifying a first link to said first webpage address, and (iii) a second organization hierarchy linking label specifying a second link to said second webpage address; and providing said portal page to said user terminal.

* * * * *